(12) United States Patent
Sakai

(10) Patent No.: US 8,184,311 B2
(45) Date of Patent: May 22, 2012

(54) IMAGE PROCESSING SYSTEM

(75) Inventor: Masahiko Sakai, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 1881 days.

(21) Appl. No.: 11/111,855

(22) Filed: Apr. 22, 2005

(65) Prior Publication Data

US 2005/0243364 A1  Nov. 3, 2005

(30) Foreign Application Priority Data

Apr. 28, 2004  (JP) ................................. 2004-133913

(51) Int. Cl.
*G06F 15/163* (2006.01)

(52) U.S. Cl. ........ 358/1.15; 358/1.1; 713/150; 713/171; 713/170; 340/5.6; 340/5.8

(58) Field of Classification Search .................. 358/1.1, 358/1.9, 1.15; 709/247; 713/170–171, 150; 701/247; 705/64

See application file for complete search history.

(56) References Cited

U.S. PATENT DOCUMENTS

| 5,495,348 | A | 2/1996 | Sakai et al. | 358/501 |
|---|---|---|---|---|
| 5,748,797 | A | 5/1998 | Sakai et al. | 382/256 |
| 5,870,531 | A | 2/1999 | Sakai et al. | 395/109 |
| 6,862,583 | B1 * | 3/2005 | Mazzagatte et al. | 705/64 |
| 2003/0014368 | A1 * | 1/2003 | Leurig et al. | 705/64 |
| 2005/0289346 | A1 | 12/2005 | Minagawa | |

FOREIGN PATENT DOCUMENTS

| EP | 1 071 254 A2 | 1/2001 |
|---|---|---|
| JP | 3-272271 | 12/1991 |
| JP | 2000-094777 | 4/2000 |
| JP | 2000-278260 | 10/2000 |
| JP | 2001-159960 | 6/2001 |
| JP | 2001-188664 | 7/2001 |
| JP | 2002-026895 | 1/2002 |
| JP | 2002-026906 | 1/2002 |
| JP | 2002-312146 | * 10/2002 |
| JP | 2003-345558 | 12/2003 |
| JP | 2004-086894 | 3/2004 |
| JP | 2005-182266 | 7/2005 |
| WO | 2004/013749 A1 | 2/2004 |

OTHER PUBLICATIONS

English translation of JP 2002312146 A, Oct. 25, 2002, Kenji Waki.*

* cited by examiner

*Primary Examiner* — King Poon
*Assistant Examiner* — Iriana Cruz
(74) *Attorney, Agent, or Firm* — Fitzpatrick, Cella, Harper & Scinto

(57) ABSTRACT

An image processing system including an image processing device and a control device which controls data transfer to said image processing device is provided. When the control device is connected to the image processing device via the network, the control device encrypts the decrypted data and transfers the encrypted data to the image processing device via the network, and when the control device is connected to the image processing device via a leased cable, the control device transfers the decrypted data to the image processing device via the cable.

11 Claims, 22 Drawing Sheets

FIG. 19

STATUS OF JOB | STATUSES OF ALL JOBS | LOG OF ALL JOBS

PLEASE SELECT JOB TO BE PRINTED FROM SAVE JOB LIST,
AND TOUCH [START PRINTING]

INPUT ID AGAIN

■SAVE JOB LIST (3 JOBS) ⎫
                        ⎬ 1901
                        ⎭

| SAVE DATE & TIME | JOB NAME | USER NAME | NUMBER OF PAGES | STATUS |
|---|---|---|---|---|
| ☑ 02/18 15:42 | 211K.bmp | Administr... | 2 | PRINTABLE |
| ☑ 02/18 15:49 | Microsoft Word-... | kuwashima | 1 | PRINTABLE |
| ☑ 02/18 16:00 | Microsoft Word-... | kuwashima | 1 | PRINTABLE |

SELECT ALL | CANCEL ALL    ⇨    ERASE    START PRINTING ↲
                                         1902
                                 1903

■JOB LIST DURING PRINTING (0 JOB)

| SAVE DATE & TIME | JOB NAME | USER NAME | NUMBER OF PAGES | STATUS |
|---|---|---|---|---|
| | | | | |

SELECT ALL | CANCEL ALL                              STOP PRINTING

IMAGE PROCESSING SYSTEM

FIELD OF THE INVENTION

The present invention relates to an image processing system and, more particularly, to a technique of ensuring the integrity of data in transferring data to an image processing device.

BACKGROUND OF THE INVENTION

A printer which prints upon reception of a print job via a network from a host terminal is commonly known as a network printer. In an environment in which a print job is transferred via a network, the integrity of confidential information contained in the print job must be secured. Examples of a general method of securing the integrity of confidential information are as follows.

First, when a print job containing confidential information is to be transmitted to a print node, a host computer encrypts the print job and then transmits it to the print node. The print node decrypts the encrypted print job and prints it (see, e.g., Japanese Patent Laid-Open No. 2004-086894).

Second, a print node temporarily stores a print job transmitted from a host computer, and only when the print node authenticates the user by using an IC card or the like, permits printing (see, e.g., Japanese Patent Laid-Open No. 2001-188664).

As a means for implementing the first method, a printer itself directly comprises a function for decrypting encrypted data. In addition, a control device may be arranged on the input stage of the printer and equipped with a decryption function. In this later case, the printer does not need to include a decryption function, and instead a conventional printer can be advantageously used.

In association with this, Japanese Patent Laid-Open No. 2001-159960 discloses a form in which a printer is connected to a set-top box installed in the subscriber's house or the like in a two-way communication system capable of using the Internet service. This reference discloses a technique of transferring print data to the set-top box via a network only after confirming that the concerned communication channel is a secured one. This technique ensures the integrity of print data between the print data transfer source and the set-top box.

At the same time, it is required to maintain a certain degree of freedom in the network configuration so as to cope with various user environments and user requests. In light of this, the system should allow the selection of either a configuration in which a control device and a printer having a function for decrypting encrypted data are directly connected by a cable, or a configuration in which they are connected via a network such as a LAN.

When a printer does not include any function for decrypting encrypted data, unencrypted data shall be transferred from the control device to the printer by directly connecting the control device and printer with a cable. This direct connection prevents any leakage of confidential information that could otherwise occur in a network configuration. Even when a printer has a function for decrypting encrypted data, the processing load of data encryption and decryption may be reduced by directly connecting the control device and the printer with a cable.

On the other hand, when a control device and a printer are connected via a network, the integrity of the transmitted print data must be ensured differently. Japanese Patent Laid-Open No. 2001-159960 described above assumes the configuration in which a printer and a set-top box serving as a control device are directly connected with a cable. Thus, Japanese Patent Laid-Open No. 2001-159960 does not consider the integrity of the transmitted print data between the set-top box and the printer when they are connected via a network.

SUMMARY OF THE INVENTION

In view of the above problems in the conventional art, the present invention has an object to ensure the integrity of data transmitted between an image processing device and a control device in consideration of their connection configuration by exploiting the characteristic of the connection configuration in a system having the image processing device and the control device which controls data transfer to the image processing device.

In one aspect of the present invention, a control device which controls data transfer to an image processing device, includes a first connection unit configured to connect a network, a second connection unit configured to connect a cable designed for data transfer, wherein the cable is different from the network, means for receiving encrypted data from an external device via the network, means for decrypting the received/encrypted data, and means for, when the connection to the image processing device uses the network, encrypting the decrypted data and transferring the encrypted data to the image processing device via the network, and when the connection to the image processing device uses the cable, transferring the decrypted data to the image processing device via the cable.

The above and other objects and features of the present invention will appear more fully hereinafter from a consideration of the following description taken in connection with the accompanying drawings wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 19 is a view showing an example of a user interface window by encrypted-data secure printing according to the embodiment of the present invention.

DETAILED DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

Figure 1:
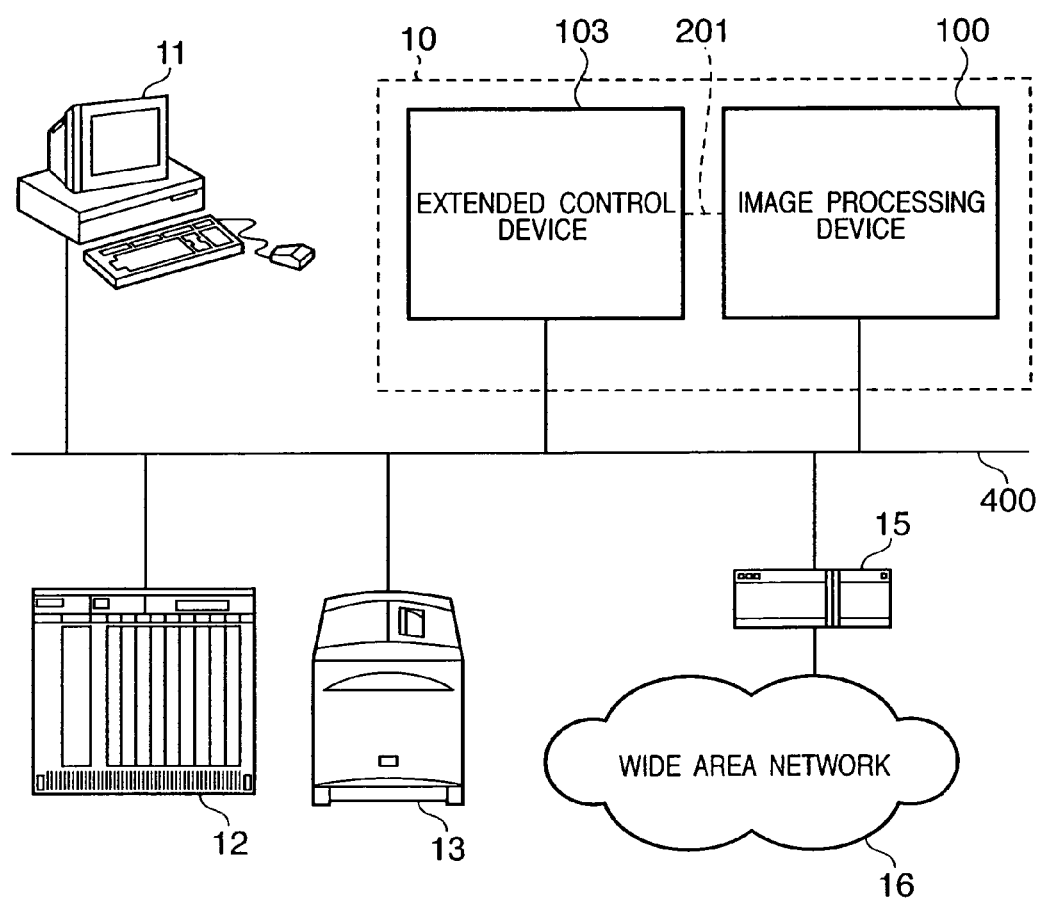
FIG. 1 is a schematic view showing an example of a network environment in which an image processing system according to an embodiment of the present invention is used.

FIG. 1 is a schematic view showing an example of a network environment in which an image processing system according to an embodiment is used.

An image processing system 10 is comprised of an image processing device 100 and control device 103. The image processing device 100 is a so-called multi function peripheral having the functions of a printer, image input, document filing, document transmission/reception, image conversion, and the like. The control device 103 provides an extended function to the image processing device 100. In this sense, the control device 103 will be called an "extended control device". The image processing device 100 and extended control device 103 are respectively connected to a LAN 400, communicate with another network node via the LAN 400, and also communicate with each other via the LAN 400.

The image processing device 100 and extended control device 103 are configured so that they can also communicate via a local interface (I/F) 201 instead of communication via the LAN 400 (in FIG. 1, the local I/F 201 is illustrated with a broken line to represent that the image processing device 100 and extended control device 103 are not connected by the local I/F 201). The local I/F 201 complies with, e.g., USB or IEEE1394. The user (in general, the network administrator or system administrator) can select either one of the two connection configurations in advance. The local I/F 201 is preferably adopted particularly in the use of a conventional image processing device having no decryption module.

A client personal computer (PC) 11 is a personal-use information processing device, is located on the user's desk in most cases, and executes various application programs. The client PC 11 is connected to the LAN 400, utilizes services provided by another network node, and provides services to another network node. The client PC 11 functions as a host computer for the image processing system 10, and thus will be called a host computer hereinafter.

A server computer 12 is a large-scale information processing device, is connected to the LAN 400, and mainly provides services to another network node via the LAN 400.

A printer 13 is a peripheral device corresponding to a network, is connected to the LAN 400, and provides services of the image processing device 100 to another network node via the LAN 400.

A router 15 is a network node for connecting networks to each other, and connects the LAN 400 to a wide area network 16 such as the Internet or a virtual private network.

The LAN 400 is a local area network laid out in the user's office or the like.

Figure 2:
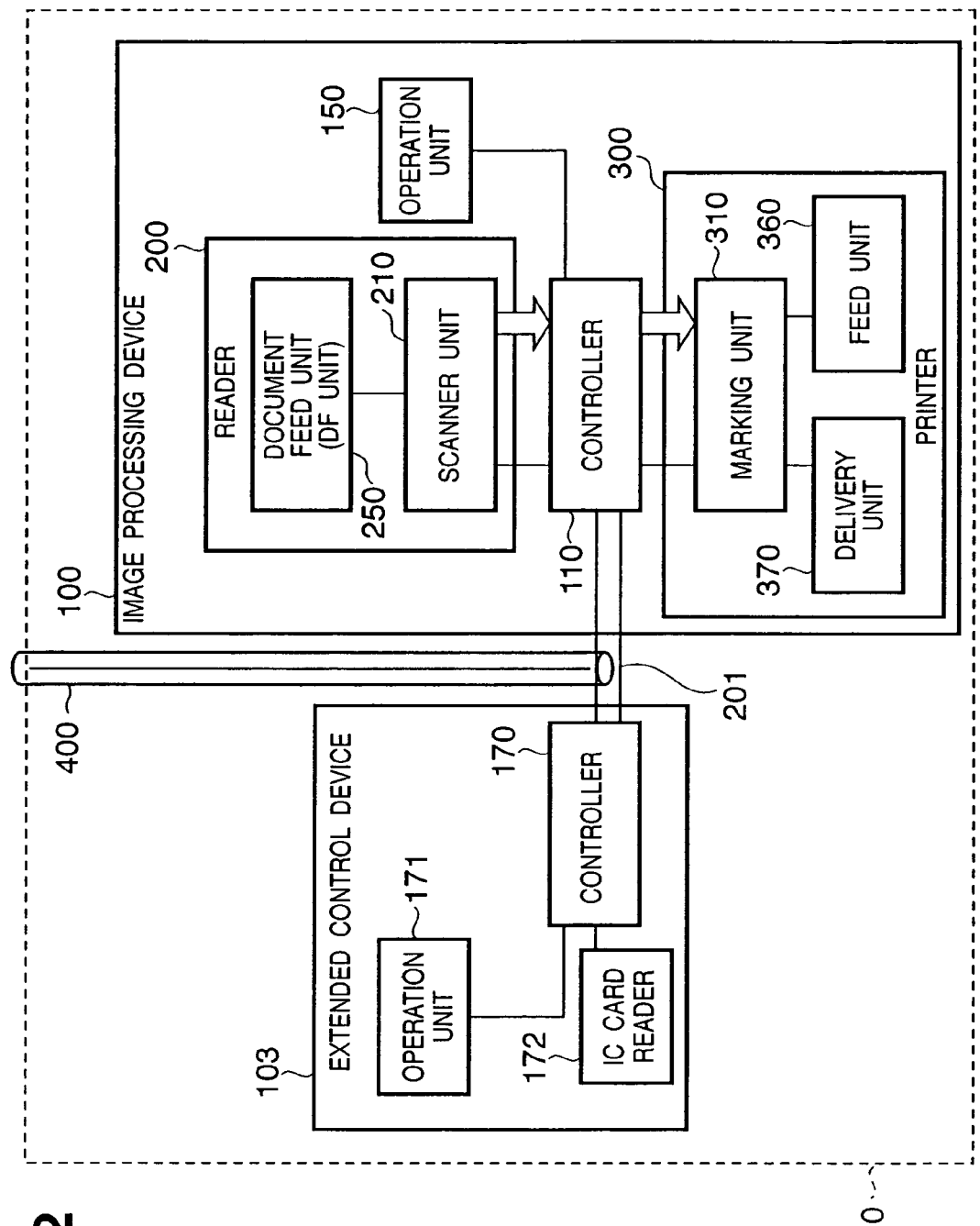
FIG. 2 is a block diagram showing the configuration of the image processing system according to the embodiment of the present invention.

FIG. 2 is a block diagram showing the configuration of the image processing system 10 according to the embodiment.

As described above, the image processing device 100 provides various basic image processing functions such as a printer, image input, document filing, document transmission/reception, and image conversion.

A reader (image input device) 200 optically reads a document image and converts it into image data. The reader 200 is made up of a scanner unit 210 having a function of scanning a document and a document feed unit 250 having a function of conveying a document paper sheet.

A printer (image output device) 300 conveys a print paper sheet, prints image data as a visible image on the print paper sheet, and delivers the print paper sheet outside the device. The printer 300 is made up of a feed unit 360 having a plurality of types of print paper cassettes, a marking unit 310 having a function of transferring and fixing image data onto a print paper sheet, and a delivery unit 370 having a function of sorting and stapling a printed paper sheet and outputting it outside the device.

A control unit 110 is electrically connected to the reader 200 and printer 300, and is also connected to the LAN 400. The control unit 110 provides a copying function of controlling the reader 200 to scan image data of a document and controlling the printer 300 to output image data on a print paper sheet. The control unit 110 also provides a scanner function of converting image data read by the reader 200 into code data and transmitting the code data to a host computer (not shown) via the LAN 400, and a printer function of converting code data received from the host computer via the LAN 400 into image data and outputting the image data to the printer 300.

An operation unit 150 is connected to the control unit 110, formed from a liquid crystal touch panel, and provides a user interface for operating an image input/output system.

The extended control device 103 is made up of a control device main body 170 and operation unit 171. The extended control device 103 preferably comprises an IC card reader 172 used for user authentication. The control device main body 170 is formed from, e.g., a hardware architecture equivalent to a well-known personal computer, and can execute general software including a general-purpose operating system, various device drivers, and various application programs. The operation unit 171 provides a user interface for allowing the user to operate the extended control device 103. The IC card reader 172 is a peripheral device provided to a general personal computer.

The image processing device 100 and extended control device 103 are connected to each other via the LAN 400 and can communicate with each other. The local interface 201 is an optional interface for providing a dedicated communication channel between the image processing device 100 and the extended control device 103, and is implemented by a USB or dedicated bus.

Figure 3A:
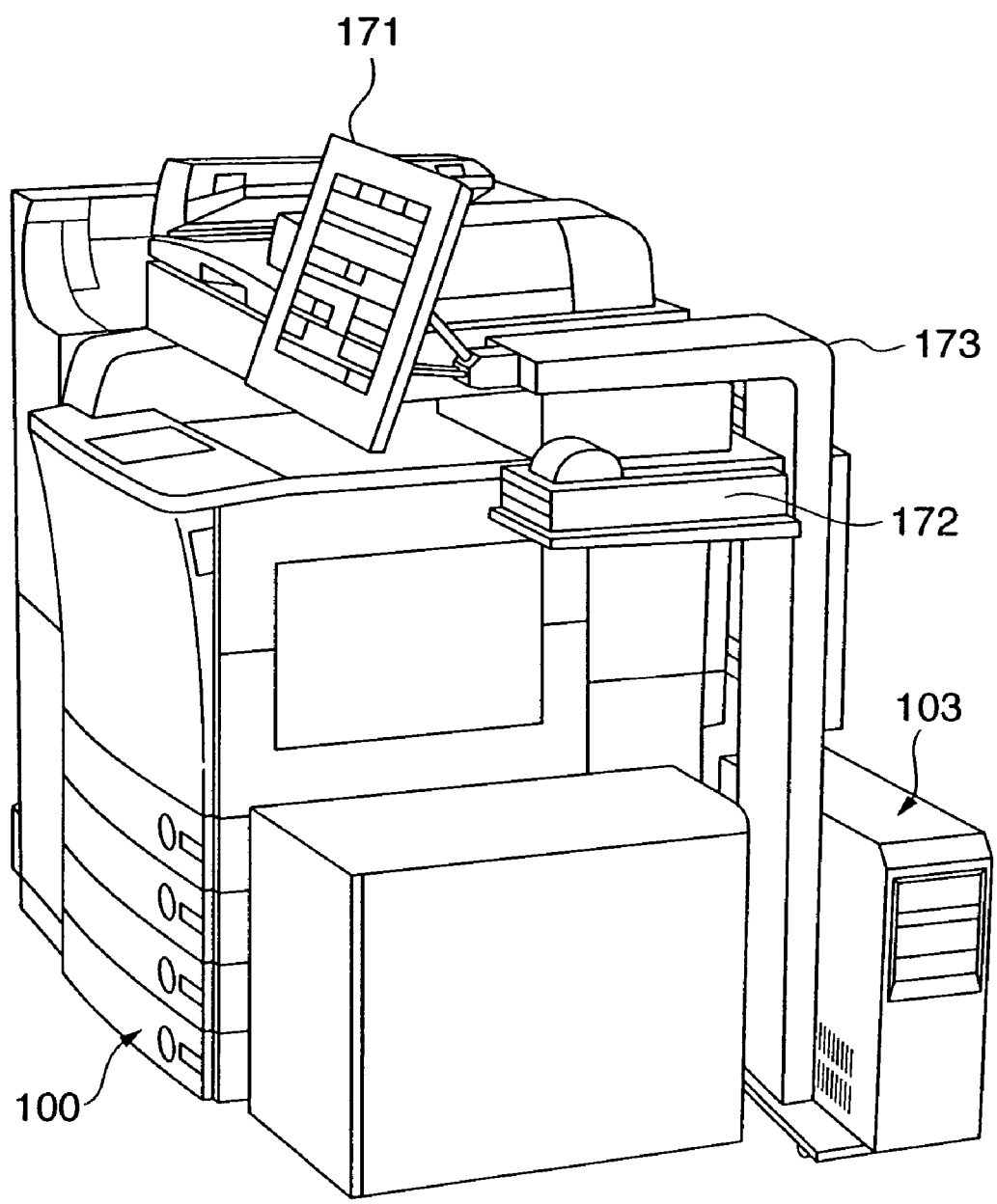
FIG. 3A is an outer perspective view showing the image processing system according to the embodiment of the present invention when viewed from the front side.
Figure 3B:
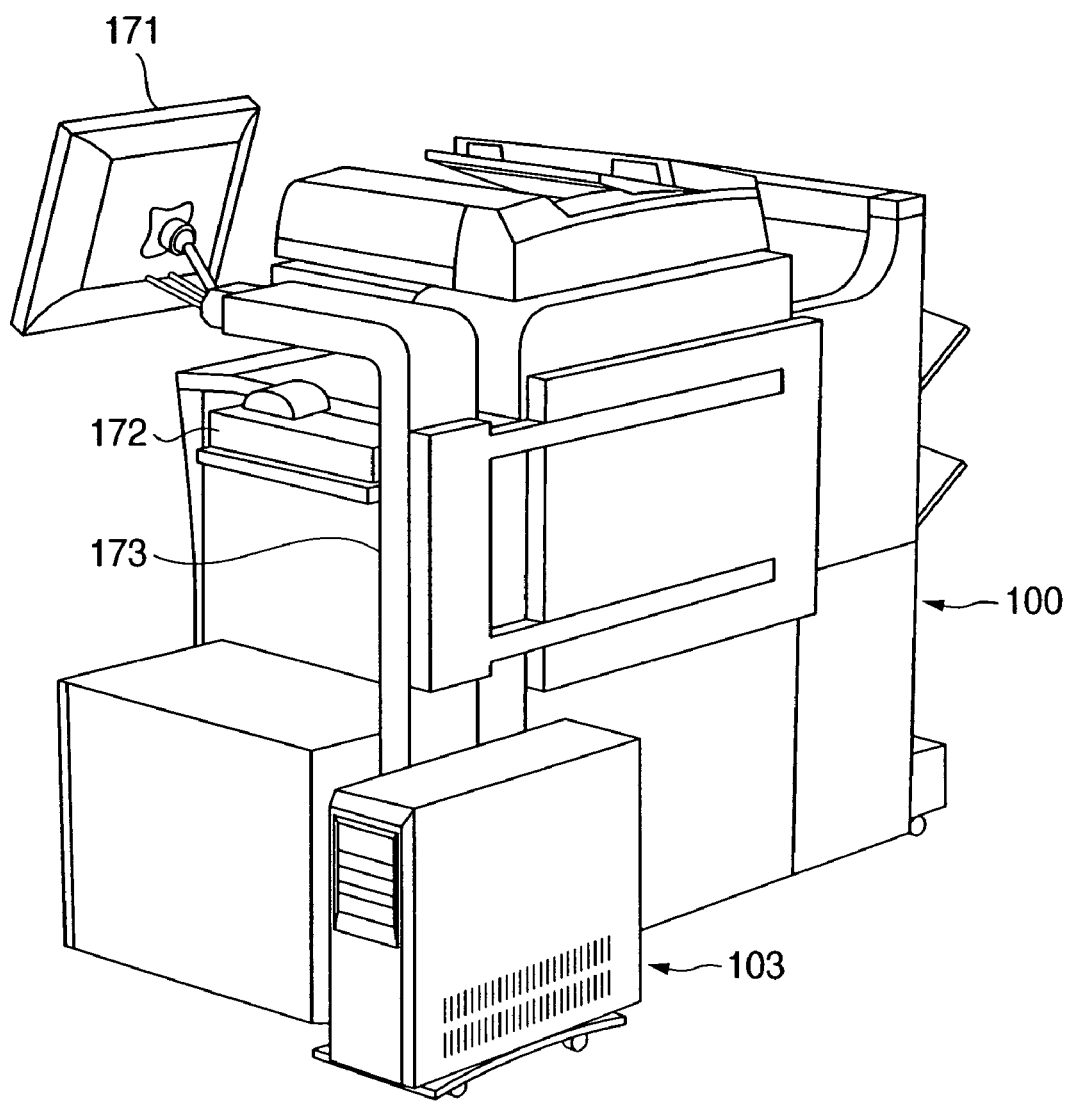
FIG. 3B is an outer perspective view showing the image processing system according to the embodiment of the present invention when viewed from the back side.

FIG. 3A is an outer perspective view showing the image processing system according to the embodiment when viewed from the front side, and FIG. 3B is an outer perspective view when viewed from the back side.

As shown in FIGS. 3A and 3B, the extended control device 103 is set behind the image processing device 100. Reference numeral 171 denotes an operation unit of the extended control device 103. The operation unit 171 is, e.g., a liquid crystal display covered with a transparent touch panel on the surface, and is electrically connected to the extended control device 103. The IC card reader 172 is an I/O device electrically connected to the extended control device 103. The operation unit 171 and IC card reader 172 of the extended control device 103 are set on a dedicated stand 173 so that the user who stands in front of the image processing device 100 can easily operate them.

Figure 4:
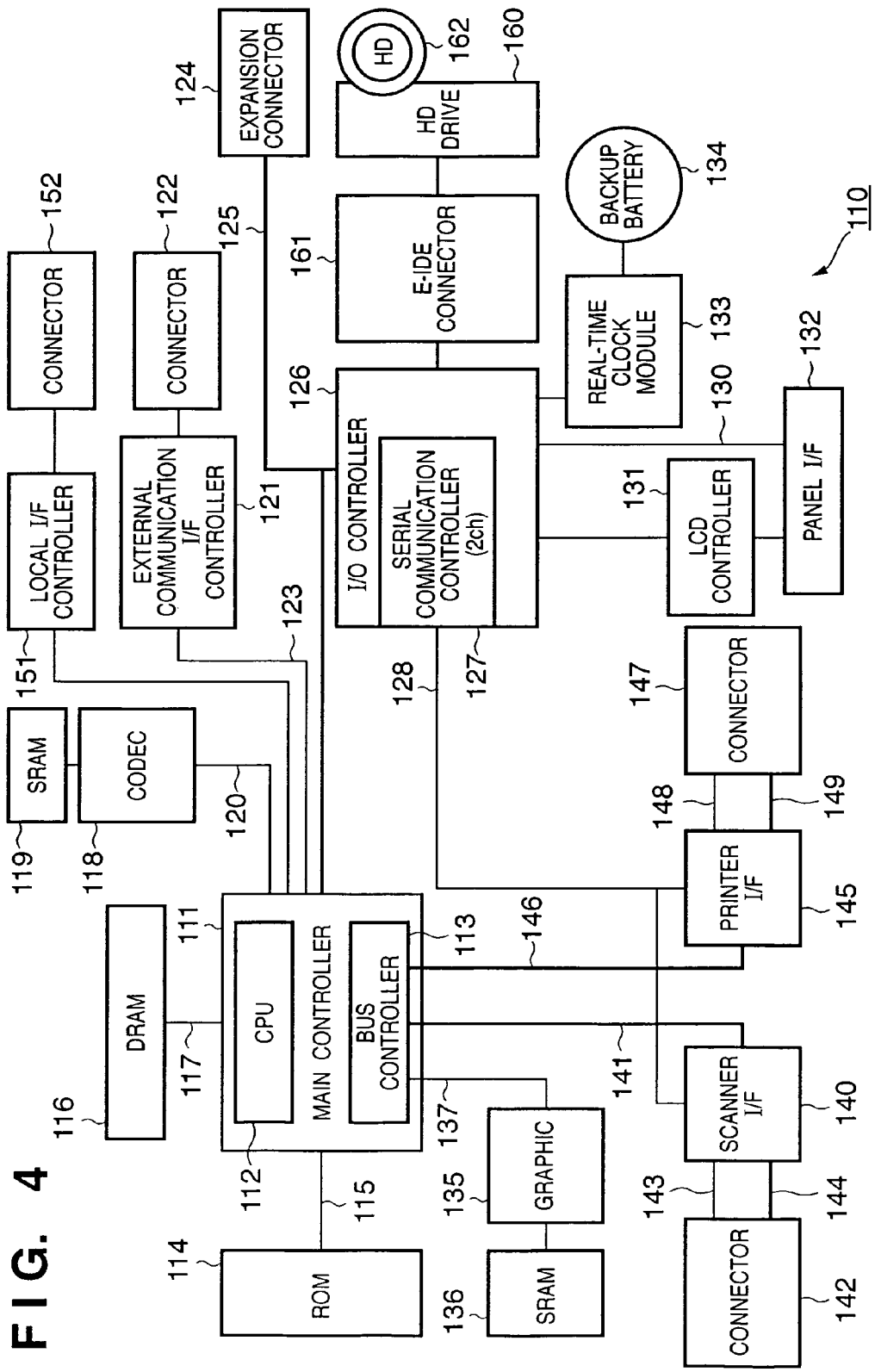
FIG. 4 is a block diagram showing the hardware configuration of the control unit of an image processing device according to the embodiment of the present invention.

FIG. 4 is a block diagram showing the hardware configuration of the control unit 110 of the image processing device 100.

A main controller 111 is mainly made up of a CPU 112, a bus controller 113, and various I/F controller circuits.

The CPU 112 and bus controller 113 control the overall operation of the control unit 110, and the CPU 112 runs on the basis of a program loaded from a ROM 114 via a ROM I/F 115. This program also describes an operation of interpreting PDL (Page Description Language) code data received from a host computer and rasterizing the PDL code data into raster image data, and is processed by software. The bus controller 113 controls transfer of data input/output from each I/F, and performs arbitration upon bus contention and control of DMA data transfer.

A DRAM 116 is connected to the main controller 111 via a DRAM I/F 117, and is used as a work area for operating the CPU 112 and an area for storing image data.

A Codec 118 compresses raster image data stored in the DRAM 116 by a format such as MH/MR/MMR/JBIG/JPEG, and decompresses compressed/stored code data into raster image data. An SRAM 119 is used as a temporary work area for the Codec 118. The Codec 118 is connected to the main controller 111 via an I/F 120, and data transfer with the DRAM 116 is controlled as DMA transfer by the bus controller 113.

A graphic processor 135 performs processes such as image rotation, variable magnification processing, and gamut mapping.

A connector 122 is connected to the main controller 111 via an external communication I/F controller 121, and connects the main controller 111 to the LAN 400. A connector 152 is connected to the main controller 111 via a local I/F controller 151, and connects the local I/F 201.

A general-purpose high-speed bus 125 connects an I/O controller 126 and an expansion connector 124 for connecting an expansion board. The general-purpose high-speed bus is generally a PCI bus.

The I/O controller 126 is equipped with a start-stop synchronization serial communication controller 127 for two channels that transmits/receives control commands to/from the CPUs of the reader 200 and printer 300. The I/O controller 126 is connected to external I/F circuits 140 and 145 via an I/O bus 128.

A panel I/F 132 is connected to an LCD controller 131, and formed from an I/F for display on the liquid crystal screen of the operation unit 150 and a key input I/F 130 for inputs from hard keys and touch panel keys.

The operation unit 150 comprises a liquid crystal display, a touch panel input device adhered onto the liquid crystal display, and a plurality of hard keys. A signal input from the touch panel or hard key is transmitted to the CPU 112 via the panel I/F 132 described above, and the liquid crystal display displays image data sent from a panel I/F 520. The liquid crystal display displays functions and image data in the operation of the image processing device 100.

A real-time clock module 133 updates and saves a date and time managed within the device, and is backed up by a backup battery 134.

An E-IDE interface 161 connects an external storage device. The embodiment uses the I/F 161 to connect a hard disk drive 160, store image data in a hard disk 162, and load image data from the hard disk 162.

Connectors 142 and 147 are respectively connected to the reader 200 and printer 300, and made up of start-stop synchronization serial I/Fs (143 and 148) and video I/Fs (144 and 149).

The scanner I/F 140 is connected to the reader 200 via the connector 142, and the main controller 111 via a scanner bus 141. The scanner I/F 140 has a function of performing a predetermined process for an image received from the reader 200, and also has a function of outputting to the scanner bus 141 a control signal generated on the basis of a video control signal sent from the reader 200.

Data transfer from the scanner bus 141 to the DRAM 116 is controlled by the bus controller 113.

The printer I/F 145 is connected to the printer 300 via the connector 147, and the main controller 111 via a printer bus 146. The printer I/F 145 has a function of performing a predetermined process for image data output from the main controller 111 and outputting the image data to the printer 300, and also has a function of outputting to the printer bus 146 a control signal generated on the basis of a video control signal sent from the printer 300.

Transfer of raster image data rasterized in the DRAM 116 to the printer is controlled by the bus controller 113, and the raster image data is DMA-transferred to the printer 300 via the printer bus 146 and video I/F 149.

Figure 5:
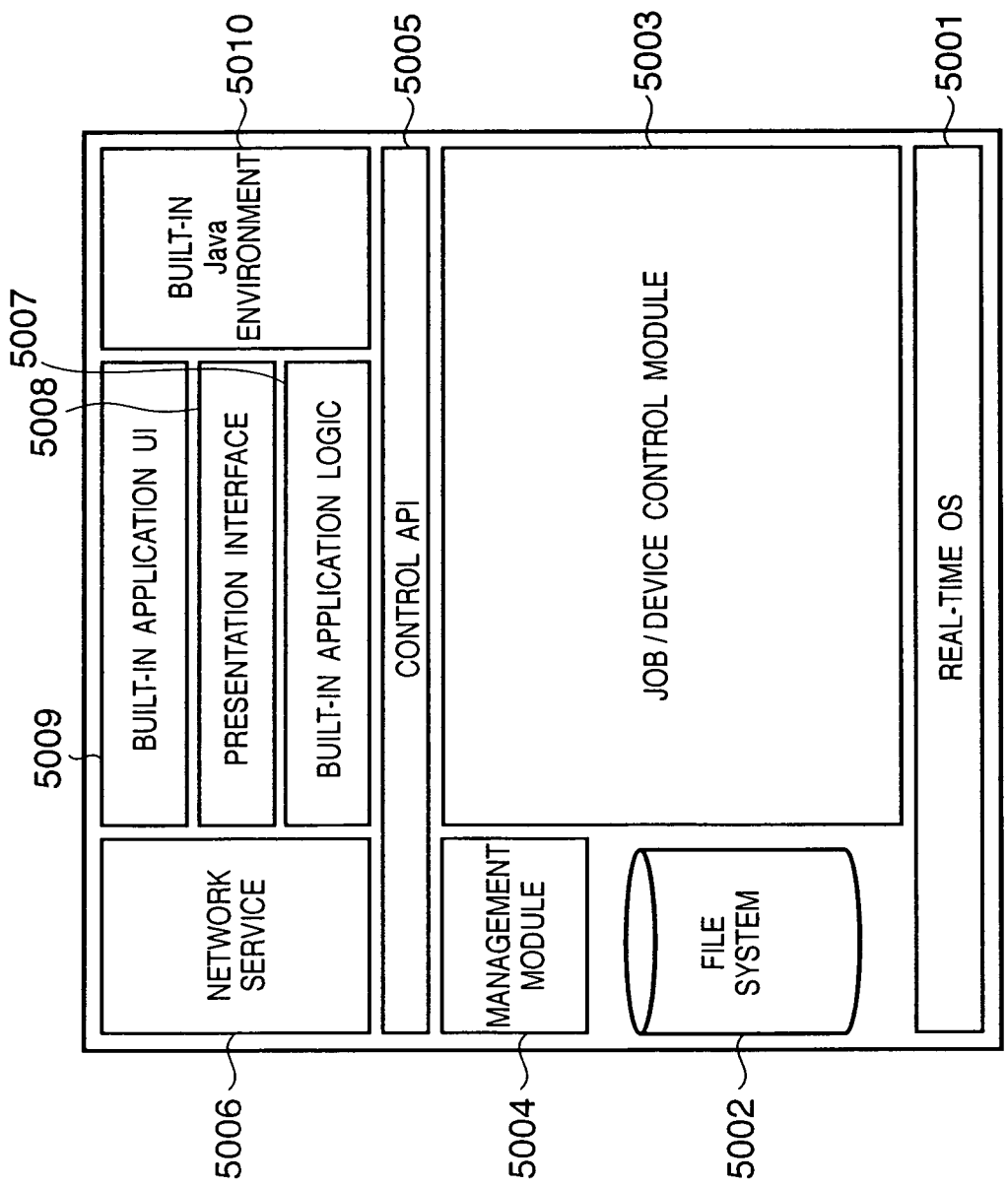
FIG. 5 is a block diagram showing the software module structure of the controller of the image processing device according to the embodiment of the present invention.

FIG. 5 is a block diagram showing the software module structure of the controller 110 of the image processing device 100.

Software processed by the controller 110 incorporated in the image processing device 100 is adopted as so-called firmware and executed by the CPU 112.

A real-time OS 5001 is a real-time operating system, and provides running software with various resource management services and frameworks optimized for control of a built-in system. Various resource management services and frameworks provided by the real-time OS include multitask management (thread management) of substantially parallel-operating a plurality of processes by managing a plurality of execution contexts of CPU processes, inter-task communication for implementing synchronization and data exchange between tasks, memory management, interrupt management, various device drivers, and protocol stacks implementing various protocol processes for a local interface, network, communication, and the like.

A file system 5002 is a mechanism for storing data in a storage device such as a hard disk or memory. The file system 5002 is used to spool jobs processed by the image processing device controller 110 and save various data.

A job/device control module 5003 controls hardware of the image processing device 100, and controls a job which uses basic functions (print, scan, communication, image conversion, and the like) provided mainly by hardware of the image processing device 100.

A management module 5004 manages the operation of the controller, for example, controls an internal state associated with the operation of the image processing device controller 110.

A control API 5005 is an application programming interface which allows built-in applications on a layer higher than the control API 5005 to utilize services provided by software modules on a layer lower than the control API 5005.

A network service 5006 allows an external network node such as the host computer 11 to utilize the basic functions of the device by converting network protocols between the network service 5006 and the control API 5005. The network service 5006 comprises a network server function equipped with various protocols (LPR, NetWare, SMB, PAP, IPP, and the like) especially for network printing, and makes it possible to issue a print job from an external network node such as the host computer 11.

The network service 5006 provides a secure network connection implemented by a technique such as encryption. The network service 5006 also provides a mechanism of easily tunneling an unsecure TCP connection by using IETF Secure Shell (secsh or SSH). An example of the internal configuration of the network service 5006 will be explained in detail with reference to FIG. 20.

A built-in application logic 5007, presentation interface 5008, and built-in application UI 5009 form a built-in application. By using the basic functions of the control API, the built-in application implements advanced functions such as copy, image scan, document transmission/reception, and document filing in addition to the basic functions of the image processing device 100. The built-in application logic 5007 corresponds to the business logic of the built-in application. The presentation interface 5008 is an interface arranged to separate the business logic of the built-in application from presentation logic. The built-in application UI 5009 corresponds to the presentation logic of the built-in application, and performs display of a graphical user interface (GUI) and control of an input in order to allow the user to operate the built-in application. The built-in application UI 5009 provides a local user interface on the operation unit 150 of the image processing device 100, and also provides a Web application implemented using a markup language such as HTML and a Web technique such as HTTP. The user can remote-control the image processing device 100 by connecting the Web application from a Web browser running on the host computer 11 or the like. The presentation layer of the built-in application installed as the Web application will be called a remote UI.

A built-in Java environment 5010 is an interpreter environment configured mainly by a Java virtual machine. The built-in Java environment 5010 is configured so that instruction string data described by Java® byte codes are read and linked in execution, and the Java virtual machine sequentially reads, interprets, and executes the instructions. This can ensure expandability and flexibility capable of dynamically adding and exchanging small part of software on firmware which is entirely statically coupled to a single load module, including the real-time OS. A Java native interface (JNI) provides Java® class libraries so configured as to allow a Java® program to utilize resources and services of firmware (native system) including the real-time OS and job/device control API. The basic part of the Java environment 5010 is constructed by well-known Java 2 Platform and Micro Edition.

A built-in application logic in the image processing device 100 can be controlled from presentation logic implemented by an application in the system of the extended control device 103.

The image processing device 100 has a flag for controlling whether to cooperate with the extended control device 103, and the flag is stored in a nonvolatile memory (not shown) or the like.

Figure 20:
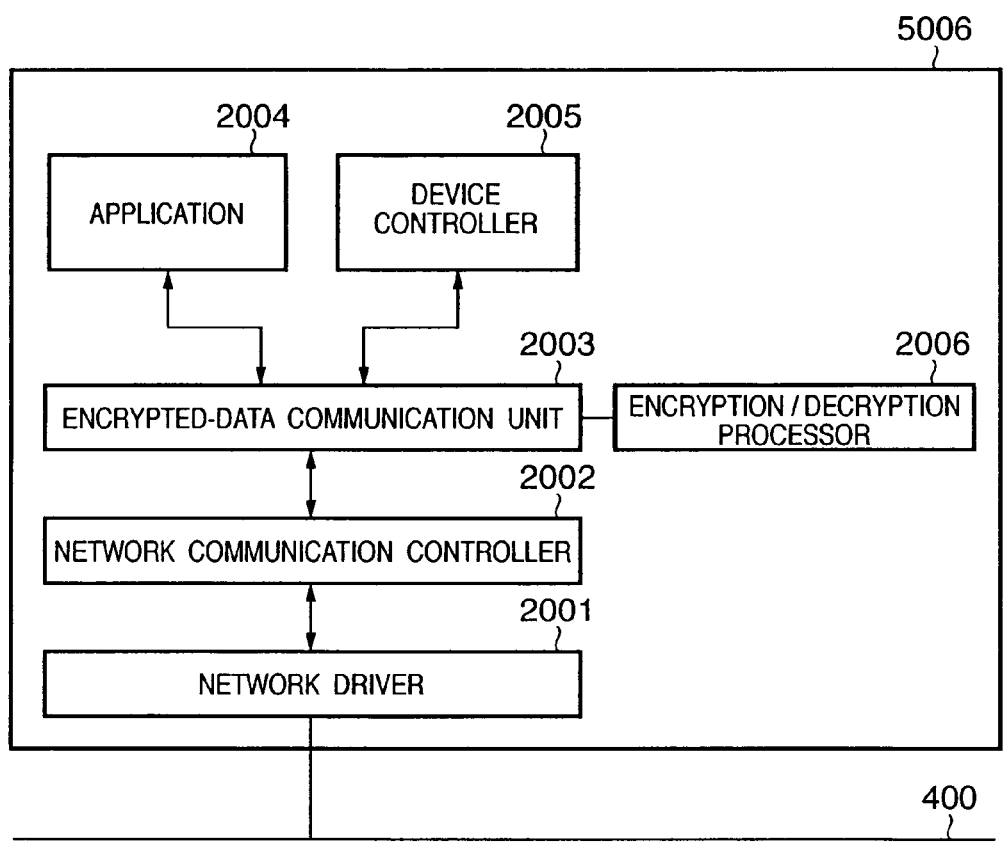
FIG. 20 is a block diagram showing the functional configuration of a network service 5006 installed in the image processing device according to the embodiment of the present invention.

FIG. 20 is a block diagram showing the functional configuration of the network service 5006 installed in the image processing device 100 according to the embodiment.

A network driver 2001 is connected to the LAN 400, controls the external communication I/F controller 121, and exchanges data via the LAN 400. A network communication controller 2002 controls a network communication protocol such as TCP/IP, and exchanges data. An encrypted-data communication unit 2003 performs encrypted-data communication by a predetermined encrypted-data communication protocol. Communication data to be exchanged is encrypted/decrypted by an encryption/decryption processor 2006.

A print application 2004 executes the function (e.g., printing) of a printing device. A device controller 2005 generates a control command and control data, and comprehensively controls the printer 300.

Figure 6:
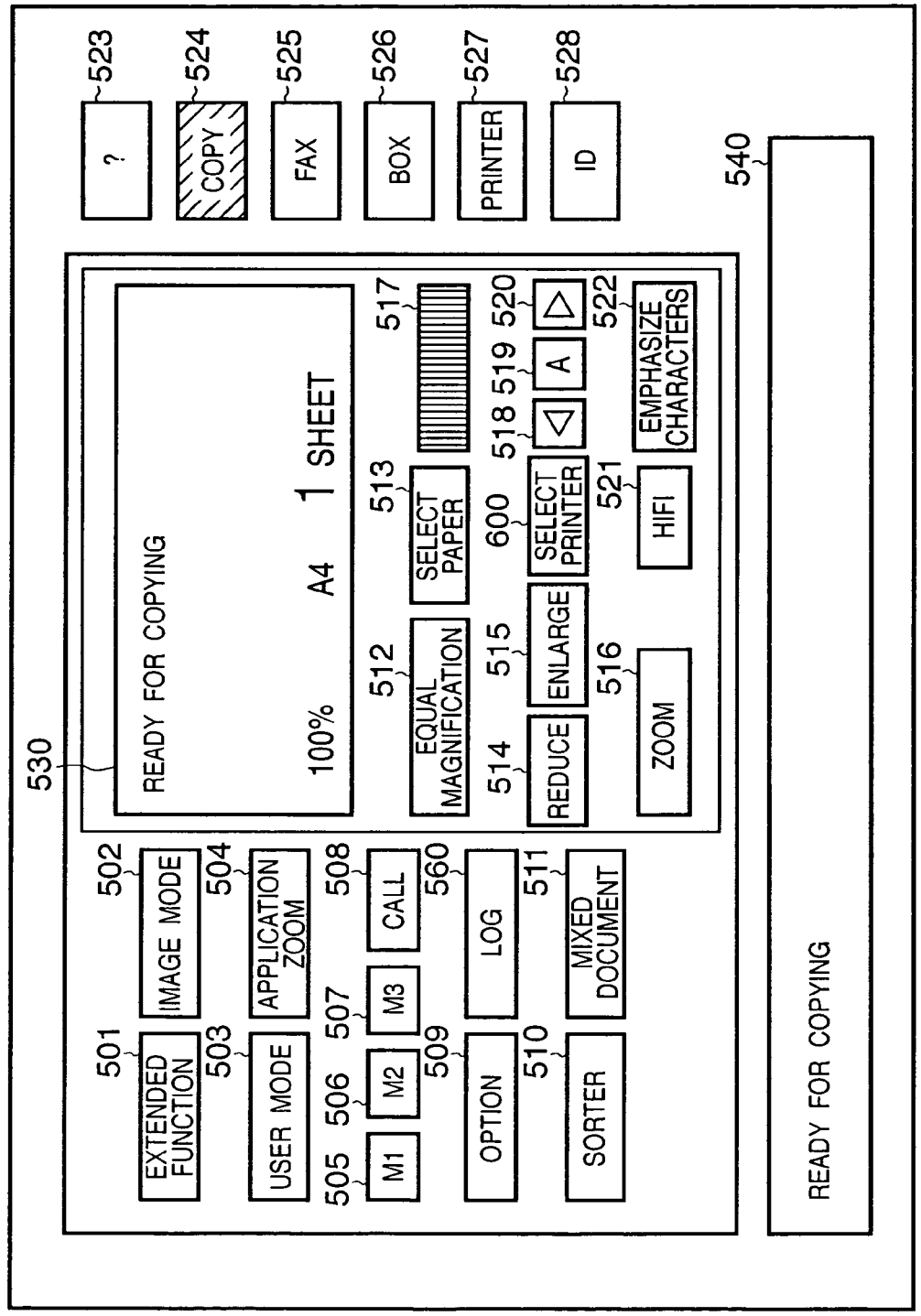
FIG. 6 is a view showing an example of a basic window displayed on the display of the operation unit of the image processing device according to the embodiment of the present invention.

FIG. 6 is a view showing an example of a basic window displayed on the display of the operation unit 150 of the image processing device 100.

The screen is a touch panel, and each displayed function is executed by touching the frame of the function. A copy mode key 524 is touched to perform copying operation. When the copy mode key 524 is touched, a copy mode window 530 is displayed. An extended function key 501 is touched to enter a mode for double-sided copying, overlay copying, move, binding margin setting, frame erase setting, and the like.

Reference numeral 540 denotes a status line which displays a message representing the status of the device and print information. In FIG. 6, copying stands by.

An image mode key 502 is touched to enter a setting mode for hatching, shading, trimming, and masking for a copied image. A user mode key 503 enables registration of a mode memory and setting of a standard mode window. An application zoom key 504 is touched to enter a mode in which a document is magnified independently in the X and Y directions and the mode of a zoom program which calculates a variable magnification ratio from the document size and copy size. An M1 key 505, M2 key 506, and M3 key 507 are keys touched to invoke registered mode memories.

An option key 509 sets an optional function such as a film projector in order to directly copy a film. A sorter key 510 sets sorting, non-sorting, and grouping. A mixed document key 511 is touched to set documents of A4 and A3 sizes or documents of B5 and B4 sizes at once on a document feeder.

An equal-magnification key 512 is touched to set the copying magnification ratio to 100%. A reduction key 514 and enlargement key 515 are touched for reduction/enlargement to a regular size. A paper selection key 513 is touched to select a copying paper sheet. Density keys 518 and 520 are used to copy data at a high density every time the key 518 is touched, and at a low density every time the key 520 is touched. A density display key 517 changes its display left and right every time the density keys 518 and 520 are touched. An AE key 519 is touched when a document whose background is dark, like newspaper, is copied by automatic density adjustment. A HiFi key 521 is touched to copy a document whose halftone density is high, like a photographic document. A character emphasis key 522 is touched to emphasize a character in copying a character document.

Reference numeral 560 denotes a log key which is touched to display log information of printed jobs. For example, information on the end time, user name, file name, and print count of a print job is displayed. Reference numeral 600 denotes a printer selection key which is touched to select a receiving-side copying machine in remote copying or cascade copying.

A guide key 523 is touched when the function of a given key is unknown, and the description of the key is displayed. A fax key 525 is touched to perform fax, and a Box key 526 is touched to display a Box function. A printer key 527 is touched to change the printing density or refer to detailed printout information of PDL data from a remote host computer.

Figure 7:
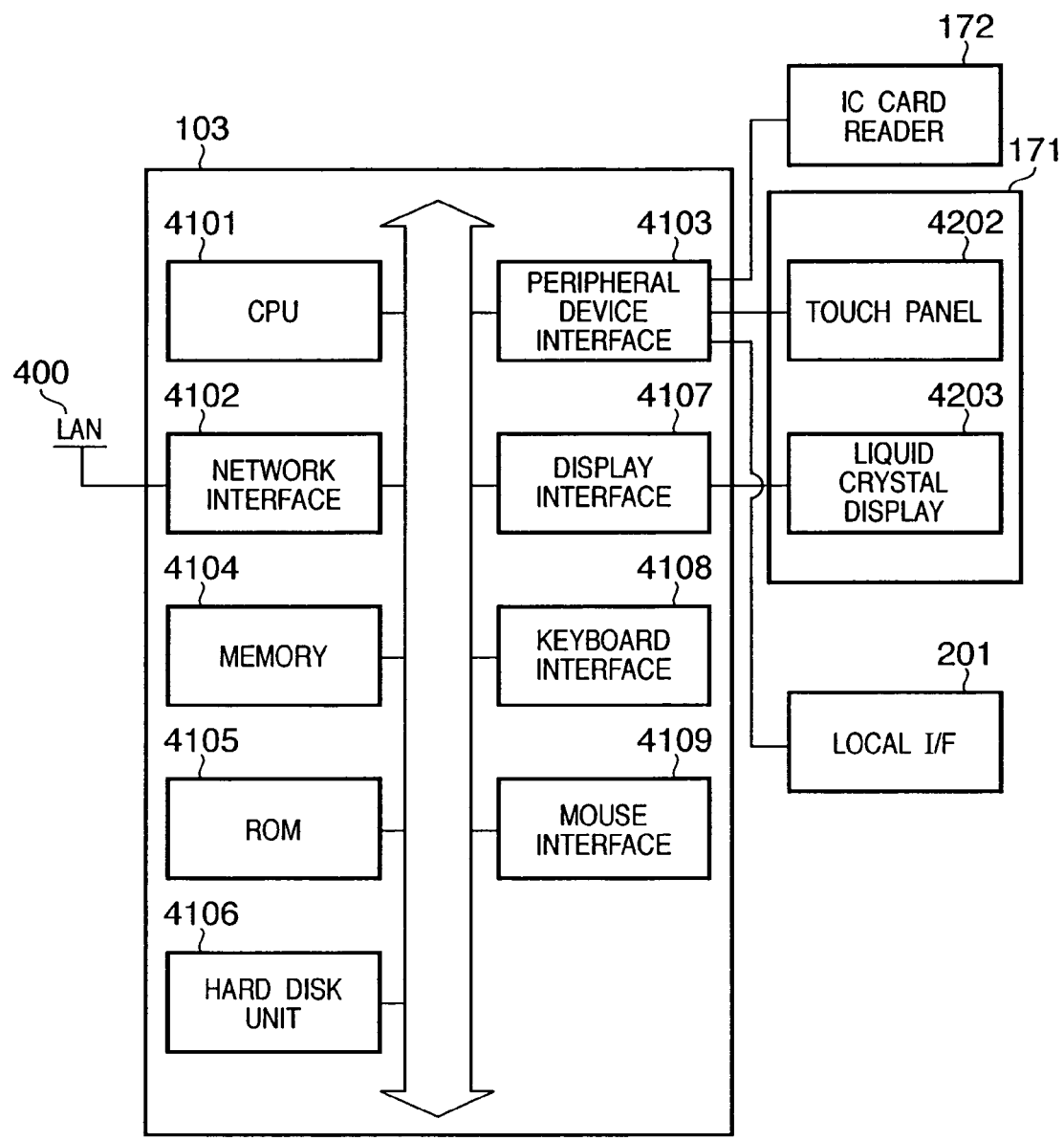
FIG. 7 is a block diagram showing the hardware configuration of an extended control device according to the embodiment of the present invention.

FIG. 7 is a block diagram showing the hardware configuration of the extended control device 103.

A main CPU 4101 is a central processing unit which controls the whole extended control device 103, and executes programs stored in a ROM 4105 and hard disk unit 4106. A network interface 4102 is an interface for connecting the extended control device 103 to the LAN 400. Software executed by the CPU 4101 can exchange data in two ways with the image processing device 100 or another computer via the LAN 400.

A memory 4104 is generally a volatile storage for saving instructions executed by the CPU 4101, data, and the like. The ROM 4105 is a read-only storage for saving programs, data, and the like for basic hardware control. The hard disk unit 4106 is generally a nonvolatile storage for saving programs executed by the CPU 4101, calculated data, and the like. The hard disk unit 4106 stores a boot program (activation program: a program which starts execution (operation) of hardware or software), a plurality of applications, edit files, user files, network management programs, and the like.

A display interface 4107 is a controller used to connect a display unit for displaying the internal state of the extended control device 103, the execution state, and the like. A keyboard interface 4108 and mouse interface 4109 can connect to the extended control device 103 an input device for allowing the user to input data and instructions.

A peripheral device interface 4103 contains specifications such as USB, RS-232C serial, and IEEE1394, and connects the IC card reader 172, operation unit 171, and local I/F 201. As described above, the IC card reader 172 is used for user authentication to specify the user. The operation unit 171 is made up of a liquid crystal display 4203 and a transparent sheet-like touch panel 4202 adhered onto the surface of the liquid crystal display 4203. The touch panel 4202 is a pointing device, similar to a mouse. Software executed by the CPU 4101 can detect as coordinate data a position on the display that is pointed by the user on the touch panel 4202. The touch panel 4202 is driven by the peripheral device interface 4103. The liquid crystal display 4203 displays the internal state of the extended control device 103, the execution state, and the like. Software executed by the CPU 4101 can draw a graphical user interface on the liquid crystal display 4203. The liquid crystal display 4203 is driven by the display interface 4107.

Figure 8:
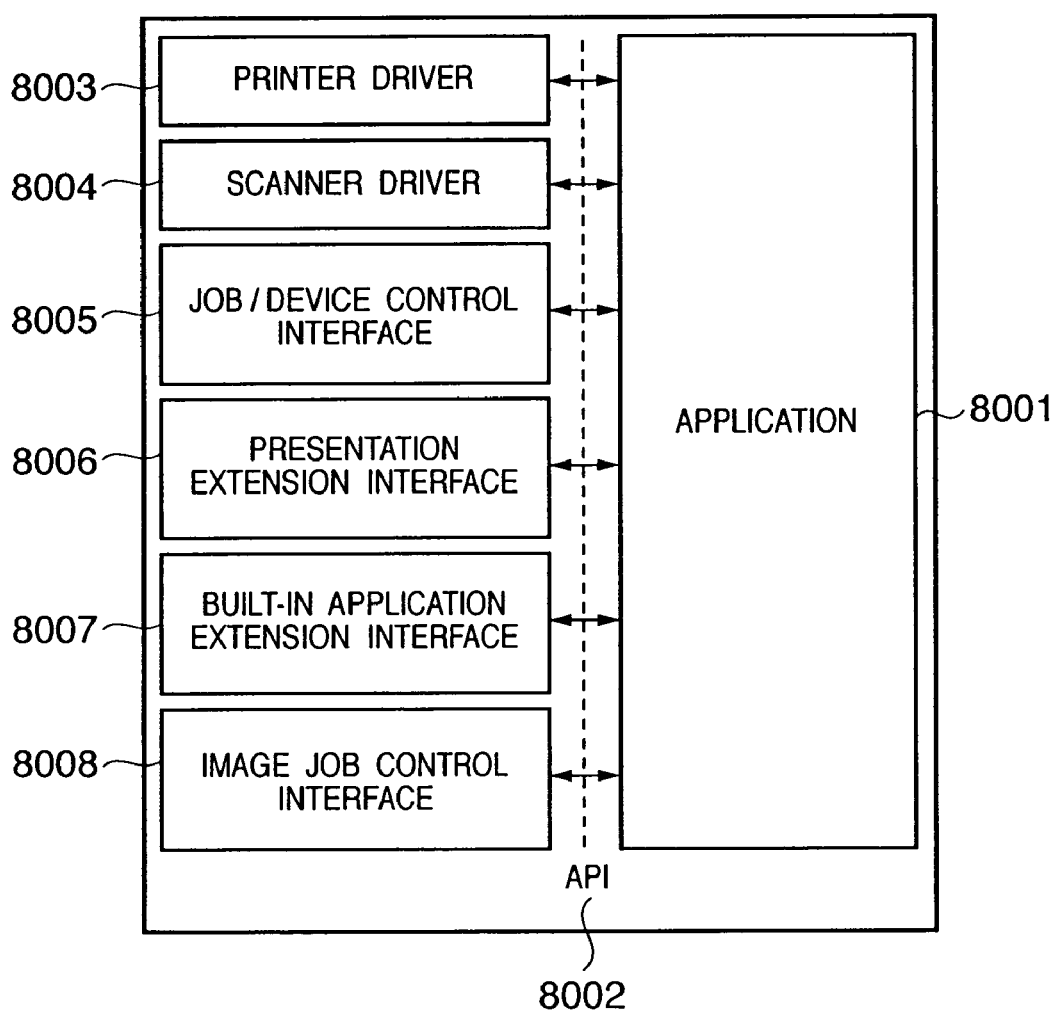
FIG. 8 is a view showing an API when an application in the extended control device interfaces with the image processing device according to the embodiment of the present invention.

FIG. 8 is a view showing an API when an application in the extended control device 103 interfaces with the image processing device 100.

Blocks in FIG. 8 correspond to software program modules executed by the CPU 4101 of the extended control device 103.

An application 8001 corresponds to various applications executed by the extended control device main body 103.

An API 8002 is an application program interface for interfacing the application 8001 with software in the image processing device controller 110.

A printer driver 8003 is a module which enables the application 8001 to print. In order to realize printing, the printer driver 8003 interfaces as a client installed in accordance with a print service protocol with the network service 5006 of the image processing device 100.

A scanner driver 8004 is a module which enables the application 8001 to scan an image. In order to realize scan, the scanner driver 8004 interfaces with the control API 5005, as a client installed in accordance with a protocol corresponding to the control API 5005 in the image processing device 100.

A job/device control interface 8005 is a module which enables the application 8001 to perform basic job control and device control. In order to realize basic job control and device control, the job/device control interface 8005 interfaces with the control API 5005, as a client installed in accordance with a protocol corresponding to the control API 5005 in the image processing device 100.

A presentation extension interface 8006 is a module which enables the application 8001 to extend the built-in application UI 5009 in the image processing device 100. This module interfaces with the presentation interface 5008, as a client installed in accordance with a protocol corresponding to the presentation interface 5008. With an API provided by this module, the application 8001 in the extended control device 103 can incorporate presentation logic (i.e., application UI) corresponding to the application UI 5009 built in the image processing device 100. Depending on installation of the application 8001, a function not provided to the built-in application UI 5009 can be extended or customized.

A built-in application extension interface 8007 is a module which enables the application 8001 to customize the built-in application logic 5007 in the image processing device 100. This module is a client installed in accordance with a protocol corresponding to a plug-in interface (not shown) incorporated in the built-in application logic, and interfaces with the built-in application logic 5007. With an API provided by this module, the application 8001 in the extended control device 103 can incorporate a plug-in for replacing or extending part of the business logic 5007 of the application built in the image processing device 100.

An image job control interface 8008 is a module which enables the application 8001 to perform particularly a high-speed image process. This module is a client installed in accordance with a protocol corresponding to the internal API of the job/device control module. By a combination with image transfer via the local interface 201, this module achieves an increase in the speed of a job for exchanging an image or document between the extended control device 103 and the image processing device 100.

Figure 9:
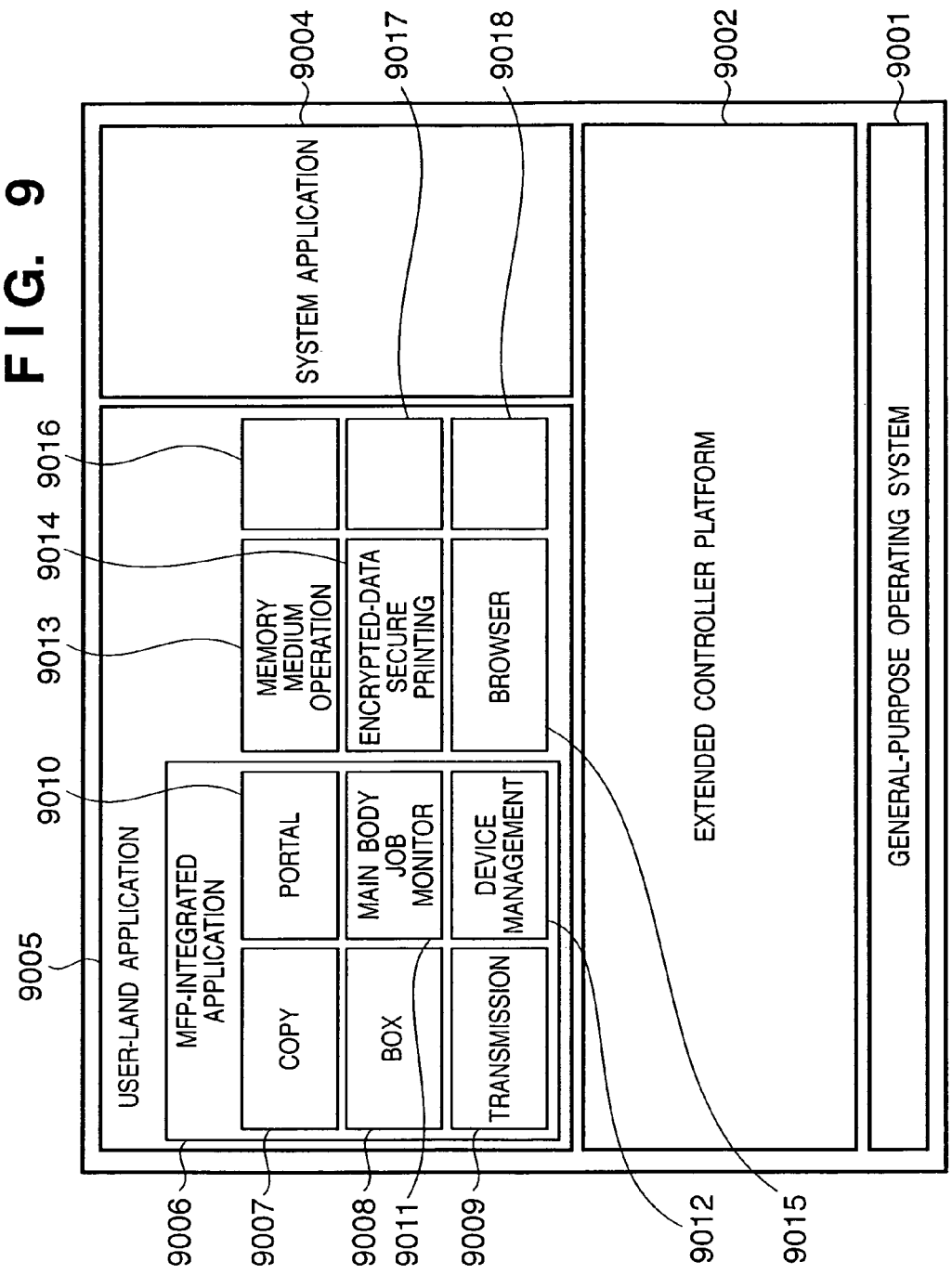
FIG. 9 is a block diagram showing the hierarchical structure of software modules of the extended control device according to the embodiment of the present invention.

FIG. 9 is a block diagram showing the hierarchical structure of software modules of the extended control device 103.

A general-purpose operating system (OS) 9001 is an operating system for the extended control device 103. Unlike the real-time OS, the general-purpose OS has been developed as software for providing the cornerstone of mainly an information processing device and computer. Examples of the general-purpose OS are Windows®, Mac OS, Solaris, Linux, FreeBSD, NetBSD, and OpenBSD. The general-purpose OS 9001 abstracts various hardware and software resources of the extended control device 103 and allows higher-order software to easily, efficiently utilize them.

The general-purpose OS provides the following mechanisms: a multiprocess mechanism and thread mechanism which substantially parallel-execute a plurality of processes by managing a plurality of execution contexts of CPU processes, inter-process communication and inter-thread communication which implement synchronization and data exchange between processes and between threads, memory management and interrupt management which are protected for each process, various device drivers, and protocol stacks implementing various protocol processes for a local interface, network, communication, and the like.

It should be noted that many device drivers for general computer peripheral devices which are commercially available comply with general-purpose OSs. This is because computer peripheral devices are generally developed for general-purpose information processing devices such as a personal computer in which a general-purpose OS runs. By adopting a general-purpose OS, hardware and device drivers for various computer peripheral devices on the market can be directly or relatively easily diverted to the extended control device 103. The extended control device 103 is an accessory added to compensate the expandability and flexibility of the image processing device 100. The purpose of the extended control device 103 is more efficiently achieved by employing not only a hardware configuration equivalent to a general-purpose image processing device but also a general-purpose OS for software.

An extended control device platform 9002 is software (library, framework, runtime module, and the like) serving as a cornerstone which provides the software operating environment of the extended control device 103. The extended control device platform 9002 includes a utility library, framework, and runtime modules which are prepared to be able to easily construct in the extended control device 103 an application for cooperating with an application built in the image processing device 100.

A system application 9004 is formed from utility applications which are normally installed in the extended control device 103 and help the user to utilize and manage an extended image processing system.

A user-land application 9005 is formed from applications for providing the user with an extended function of the extended image processing system. Each of applications classified into the user-land application 9005 can be installed and added, or uninstalled and deleted. An application can also be so controlled as to be activated only when the user purchases not only the entity of the application program but also the license to execute the application program.

An MFP-integrated application 9006 is a user-land application corresponding to the built-in application of the image processing device 100, and allows the extended control device 103 to use advanced functions and basic functions provided by the image processing device 100. The MFP-integrated application 9006 interfaces with the built-in application of the image processing device 100 via the presentation extension interface 8006 and built-in application extension interface 8007. The MFP-integrated application 9006 can provide the same functionality and user interface as those of the built-in application of the image processing device 100, and can also extend and provide the functionality and user interface. The MFP-integrated application contains and integrates application components 9007 to 9012.

The copy component 9007 is an application component corresponding to a copying function as one function of the built-in application of the image processing device 100.

The box component 9008 is an application component corresponding to a document filing function as one function of the built-in application of the image processing device 100.

The transmission component 9009 is an application component corresponding to a document transmission/reception function as one function of the built-in application of the image processing device 100.

The portal component 9010 is an application component which provides a portal site for easily invoking a frequently used function and routine process in accordance with user's preferences. The portal component 9010 combines the settings of operation parameters and a series of operations into macros throughout the application components of the MFP-integrated application 9006, and provides a user interface capable of freely arranging customized buttons for executing a plurality of macros.

The main body job monitor component 9011 is an application component for referring to the status of a job in progress within the image processing device 100 and the log of a completed job.

The device management component 9012 is an application component which provides a user interface for managing hardware of the image processing device 100.

A memory medium operation component 9013 is a user-land application for operating various removable storages (e.g., memory cards represented by a magneto-optical medium drive, USB storage, smart card, and Compact Flash®) connected as peripheral devices to the extended control device 103. The memory medium operation component 9013 can transfer a document stored in a memory medium to the image processing device 100 to print, transmit, or file the document, and receive an image-scanned or received document or a filed document by the image processing device 100 to store the document in a memory medium.

A encrypted-data secure printing component 9014 is a user-land application which provides a secure printing function of receiving an encrypted print request from the host computer 11, temporarily storing the encrypted request, and only when the operation is performed by an authenticated user and user authentication is successful, decrypting the request and causing the image processing device 100 to actually print.

A browser component 9015 is a user-land application which provides a browsing function for the Web and the like on the operation unit of the extended control device 103.

Reference numerals 9016, 9017, and 9018 are other user-land applications. As described above, the user-land application can be flexibly added, deleted, activated, and inactivated.

Figure 10:
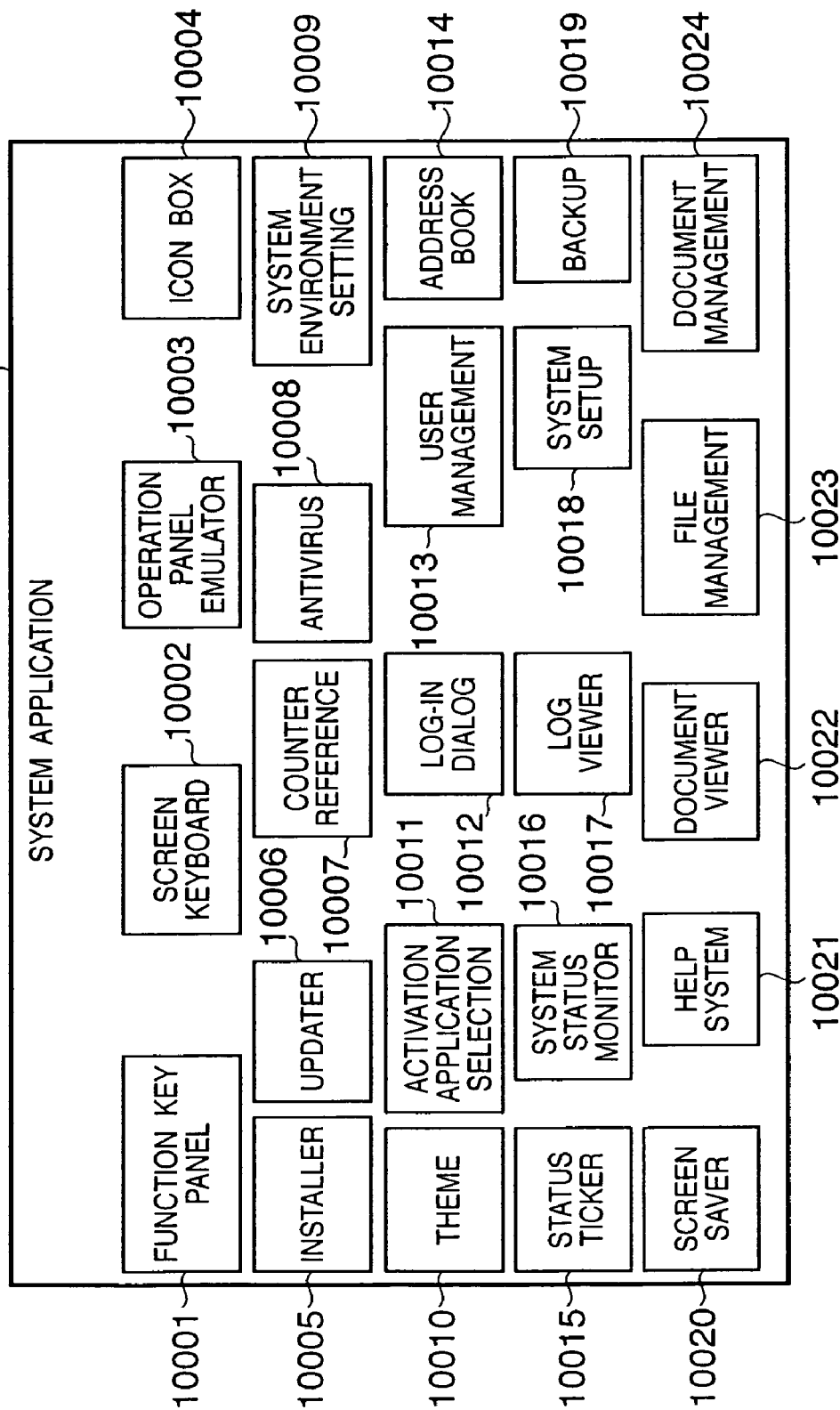
FIG. 10 is a block diagram for explaining system applications of the extended control device according to the embodiment of the present invention.

FIG. 10 is a block diagram for explaining system applications of the extended control device 103.

Software modules (packages) classified as the system application 9004 of the extended control device 103 include the following utility programs, runtime modules, and the like.

A function key panel 10001 is formed from a framework and container for arranging function menus, software keys, and the like on the desktop of the display of the operation unit of the extended control device. Arrangeable function keys are as follows: for example, default system keys (e.g., log-out key, shutdown key, counter confirmation key, remaining heat key, system status key, system setting key, and screen keyboard invoke key), application context keys (e.g., guide key, application setting key, and application status key) whose operations are switched in accordance with a selected application, and current application addition keys (e.g., keys prepared by developing and arranging part of a unique menu in an application) which are added and arranged by a selected application to help its operation.

The look & feel of the key layout can be customized (personalized) in accordance with user's preferences. The look & feel of the function key panel is switched in synchronism with the theme of the whole system. For example, when a theme such as high contrast or reverse is selected, the display of the function key panel is so switched as to reflect the characteristic of the theme. The function key panel allows arranging not only software keys and menus but also application components such as the clock and mail incoming flag. In the use status of a given user, the function key panel provides keys "user mode", "keyboard", "operation panel", "guide", "about", and "reset".

The key "user mode" instructs a currently selected application to open an environment setting dialog, or activates a system environment setting program 10009 serving as one of system applications.

The key "keyboard" designates activation of a screen keyboard 10002 serving as one of system applications.

The key "operation panel" designates activation of an operation panel emulator 10003 serving as one of system applications.

The key "guide" instructs a currently selected application to display an on-line manual in accordance with the operating status of the application by using help serving as one of system applications.

The key "about" instructs a currently selected application to display application information such as the version, development source, and copyright, or displays the version and copyright information of each module associated with the entire system.

The key "reset" instructs a currently selected application to cancel a series of operations executed halfway by the user and roll back to a preceding check box corresponding to the current status. For example, when the user touches the reset key while inputting a character string to a text input field, the character string during input is cleared. When the user touches the reset key during kana-kanji conversion of a character string, a conversion candidate-selected state is canceled, and the character string returns to kana. When the user touches the reset key while changing a setting value in a dialog for setting the operating parameters of an image processing job, the setting during change is canceled and returns to the initial value.

The screen keyboard 10002 is a software keyboard for emulating a physical full keyboard, and the operability is optimized to operate the touch panel with a finger. The screen keyboard 10002 emulates the physical keyboard at a system level as low as possible (i.e., the screen keyboard 10002 is so configured as to eliminate the necessity for discrimination from the physical keyboard at almost all system levels) in consideration of a case in which a physical keyboard is optionally connected to the extended control device 103. By covering the front surface of the display of the screen keyboard, the operability of an application serving as an input destination decreases. However, the screen keyboard is so devised as not to obstruct the input, and for example, switching between display and non-display and movement of the display position can be operated easily with a finger. The resolution of the screen keyboard is independently adjusted to prevent excessive downsizing of the keytop which is undesirable for operation with a finger as the resolution of the display further increases. The screen keyboard is targeted for internationalization, and an input language or the like is switched for a destination local to which the extended control device 103 is shipped.

The operation panel emulator 10003 is a software panel for emulating the physical operation panel of the image processing device 100. The operation panel emulator 10003 emulates by software a start key, stop key, ten-key pad, and the like which form the operation panel. Key codes generated upon touching various key components are mapped to key codes generated by a physical keyboard connected as an option to the extended control device 103. For example, when a key of the ten-key pad is touched, a key code of the physical full keyboard that corresponds to each key is generated. The GUI of the operation panel emulator is displayed in response to a request from an application, and can also be displayed by explicit operation of the user. The operation panel emulator has a plurality of modes in order to select a difference dependent on the model of the image processing device 100. For example, when the image processing device 100 is a fax-compatible device, the operation panel emulator runs in a mode having fax keys (e.g., * and #). When an application invokes the operation panel emulator, display/non-display of each key can be selected from the application.

An icon box 10004 is a system application for switching a current application. The icon box 10004 provides the presentation logic of an application selection list for prompting the user to select a user-land application to be operated at the point. The icon box 10004 lists and displays icon images and/or application names, and when the user selects an application, the current application is switched to the selected application. The application name can be displayed by either a text or image. The text is targeted for localization in conjunction with the internationalization framework. The resources of the icon images and application names are resources contained in user-land application modules. The user can edit the display order of icons, and the look & feel can be switched in synchronism with the theme. The icon box itself is the selector of an application, and is not a launcher. By providing the delayed activation mechanism of lifecycle management, an application can be so registered as to be activated only when it is selected first. Functions such as forced termination and alert display may be added for each application.

An installer 10005 is used to install various software programs which form the extended control device 103. Software to be installed includes the modules of a user-land application, system application, library, driver, and extended control device platform. A software module to be installed can be supplied from a local file system such as a removable medium, and can also be supplied via a network.

An updater 10006 is a system application for updating various software programs which form the extended control device 103. Software to be updated is identical to software to be installed by the installer 10005. A software module to be updated can be supplied from a local file system (including a removable medium), and can also be supplied via a network. The updater 10006 also has a function of detecting, via a network, update of an updater present in a server and if the updater has been updated, prompting the user to update the updater.

A counter reference program 10007 is a system application for referring to a counter value. The counter reference program 10007 can refer to both the counter of the image processing device 100 and the counter of the extended control device 103 that counts the use of an application.

An antivirus program 10008 is a system application which prevents and detects infection of a virus and repairs the system upon infection.

The system environment setting program 10009 is a system application for referring to and editing various environment setting items (preference and property) of system software and hardware of the extended control device 103. The system environment setting program is a container capable of plugging in a plurality of components, and various environment setting items are processed by components for setting them in accordance with the category. Depending on a setting target (setting item), access is properly controlled so that, for example, only the system administrator can refer to or set the system environment setting program.

A theme 10010 is a system application which provides a mechanism for unitarily setting customized items (preferences) of each application while maintaining the uniformity. For example, when the user designates, as a theme, the entire tone setting or component display size setting in accordance with the user's preferences or physical feature, various applications run in an operation mode complying with the theme.

An activation application selection program 10011 is a system application which controls activation and stop of an application for each user. The user can select an application from a list of applications installed in the system and change the application to an execution state. Whether execution is actually permitted is based on the user authority. The user can also select an application from running applications and change the application to a stop state. The system administrator can perform settings common to all users.

A log-in dialog 10012 is a system application corresponding to a log-in mechanism. The log-in dialog 10012 interacts with the user necessary to start a user session in which the user utilizes the extended image processing system. In the necessary dialog, the system demands of the user the entry of information (domain name, user name, and password) necessary for user authentication. The entry of the user name can be set to be more easily selected from a user list in addition to text input. Especially in an operation of allowing a guest user (user not required to be authenticated) to manipulate the system, log-in operation by the guest user can be facilitated. The setting of the log-in method is changed by the system administrator user. Since the log-in dialog 10012 comprises a user interface displayed when the user does not log in (during a system session other than a user session), a function of performing management operation (shutdown or the like) of the system session or a function of displaying the state of the image processing device 100 may be added. To perform user authentication based on an IC card (smart card) or biometric authentication at the start of a user session, the log-in dialog 10012 can be replaced with the implementation of a dedicated log-in dialog (the implementation of the log-in mechanism can also be replaced similarly).

A user management program 10013 is a system application for managing a user who utilizes the extended image processing system and managing the user authority.

An address book 10014 is a system application for connecting a directory service inside or outside the system and editing directory information. The address book 10014 includes destination information, but is not limited to this, and the attributes of various entities such as the user, organization, device, and service are processed as directory information.

A status ticker 10015 is a system application for displaying status information and messages notified by the system and application. The status ticker 10015 can display a text, icon image, and the like. The status ticker 10015 also performs priority-based arbitration and time-division display for a plurality of parallel message display requests. The message display of the status ticker corresponds to various display effects by an animation and the like.

A system status monitor 10016 is a system application for monitoring a system status and application status associated with both hardware and software of the extended control device 103. The system status monitor 10016 also allows confirming information on the versions and copyrights of various modules which form the extended image processing system 10.

A log viewer 10017 is a system application for referring to and managing pieces of log information of the systems and built-in applications of the extended control device 103 and image processing device 100.

A system setup program 10018 is a utility system application for assisting an initial setup procedure in installing the extended image processing system 10, a replacement procedure in replacing the image processing device 100 with a new model, and a recovery procedure when the system of the extended control device 103 is destroyed owing to any trouble and need to be recovered.

A backup program 10019 is a system application for saving data stored in the hard disks and nonvolatile memories of the extended control device 103 and image processing device 100 to a secure storage means (e.g., a removable medium, external storage, or network storage) connected to the extended control device 103, and restoring the moved data.

A screen saver 10020 is a system application for controlling display so as to prevent burn-in of the display when the user does not use the operation unit of the extended control device 103. The screen saver 10020 can also play back an animation which shows convenient use of the extended image processing system 10. Also, the screen saver 10020 can display alarm information such as shortage of paper in the image processing device 100, display a virtual bulletin board describing a message (e.g., "announcement of the date and time of a periodic maintenance") set by the system administrator or the like, and acquire and display the latest information (e.g., weather forecast or news) from the server via a network. In an operation form in which a plurality of users alternately log in and use the extended control device 103, the screen saver 10020 performs an auto log-out process for automatically logging out for a user who forgot to log out and left the device.

A help system 10021 is a system application for displaying a document which explains, e.g., how to use the overall extended image processing system 10, and assisting each user-land application in displaying the guide document. The help system 10021 has a portal function of integrating, as the whole system, guide document contents supplied by respective modules such as a system module, and application module. An application program can instruct the help system 10021 to present to the user an arbitrary portion in contents. The application can, therefore, present optimal information to the user in accordance with the operation status. The help system 10021 is configured as a Web application, can display a guide document on the operation unit 171 of the extended control device 103, and can also display a guide document on a Web browser running in the host computer 11 or the like.

A document viewer 10022 is a system application for displaying document data of various formats such as a text, image, and application-specific format. Examples of the displayed document format are a text, a document described by a markup language such as HTML, XML, or SGML, an image of JPEG, PNG, TIFF, or JBIG, a document of a page description language such as LIPS or PostScript, a document of PDF or the like, a program accompanied with display such as Macromdia Flash, Sun Java®, or Applet, an animation, and document data based on proprietary formats specific to various application programs such as a wordprocessor, presentation, and spreadsheet. Part or all of a document processed by the document viewer 10022 can undergo printing, scanning, transmission/reception, filing, and the like by the image processing device 100.

A file operation program 10023 is a system application for operating file systems constructed in various storage means incorporated in or connected to the extended control device 103, a file system of the image processing device 100, and network-shared file systems provided by the server computer 12 and host computer 11 via a network.

A document management program 10024 is a document management system installed in the extended control device 103. The document management program 10024 provides a function of implementing storage, search, and management of various document data by using the file system of the extended control device 103, the database management system of an external server, and the like.

Figure 11:
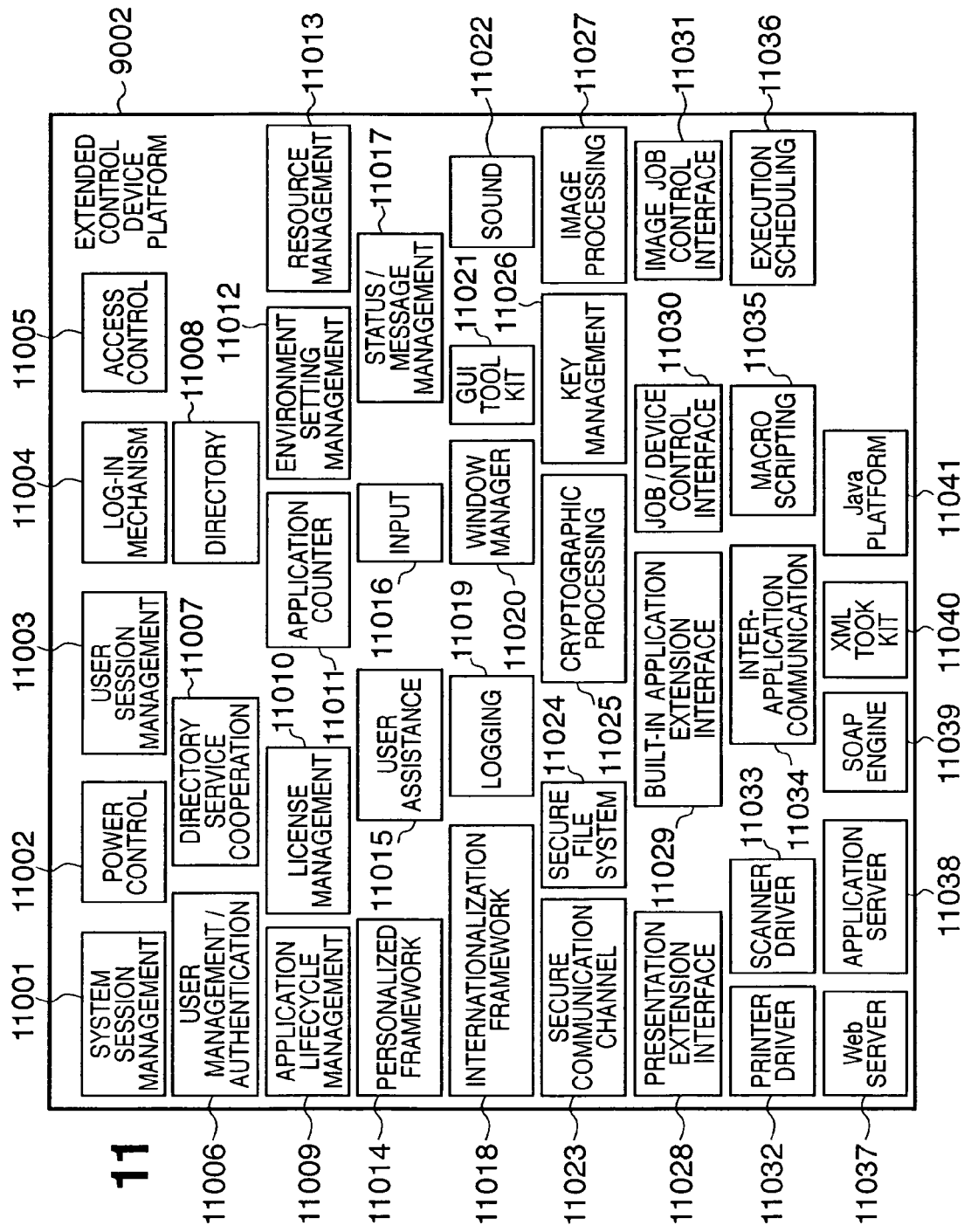
FIG. 11 is a block diagram for explaining software packages which form the software platform of the extended control device according to the embodiment of the present invention.

FIG. 11 is a block diagram for explaining software packages which form the software platform of the extended control device 103.

A system session management package 11001 manages the configuration and setting of the whole system in order to manage the sessions of the entire system from boot-up to shutdown of the extended control device 103. The system session management package 11001 also manages the lifecycle of daemon services (system application and user application installed as resident applications).

A power control package 11002 manages power control such as power saving setting of the extended control device 103. The power control package 11002 manages hardware systems (e.g., WakeOn LAN and ACPI) and BIOS setting.

A user session management package 11003 manages log-in sessions by the user from log-in to log-out. The user session management package 11003 manages the lifecycle of console applications (system application and user application running during a log-in session by the user). The user session management package 11003 assists the log-in session management mechanism of a Web application.

A log-in mechanism 11004 allows the user to start a user session, and specifies the user by user management and user authentication packages. For the purpose of integration into a user environment, a log-in mechanism which satisfies each need can be plugged in. For example, log-in mechanisms based on user authentication using an IC card (smart card) and biometric authentication can be integrated.

An access control package 11005 manages, for each user and a group to which the user belongs, the access authorities of various resources which form the image processing system 10.

A user management/authentication package 11006 manages a user account which uses the system, and specifies (identifies) the user. What-you-have authentication based on an IC card (smart card) and what-you-are authentication based on biometric authentication can be utilized in addition to what-you-know authentication based on a password.

A directory service cooperation package 11007 assign, to an external directory service, user management, user authentication, or directory information management of the extended control device 103.

A directory 11008 is a local directory service of the extended control device 103, and manages information on the user and various resources. The managed information includes the attributes of all entities managed by the directory service and the relationship between entities. For example, entities managed by a directory service such as NDS are a user, printer, file server, and the like. Management targets are resources in the system of the extended control device 103 and resources in the image processing device 100.

An application lifecycle management package 11009 manages the lifecycles (installation, update, uninstallation, activation, interruption, and stop) of a system application and user application.

A license management package 11010 manages the license of each application in the extended control device 103.

An application counter 11011 counts the use amount of each application installed in the extended control device 103 and the use amount of a system resource accompanying the use of the application. The application counter 11011 can count not only for the total system but also for each user.

An environment setting management package 11012 is a database which holds the environment settings (preference, property, and configuration) of the whole system and respective applications. The environment setting management package 11012 manages user-independent common settings and settings specific to each user.

A resource management package 11013 helps structurize and manage various resources (localizable character string, icon image, sound, plug-in, GUI description, auxiliary data, and the like) which form an application.

A personalized framework 11014 provides a framework for reflecting the user's preferences horizontally on the application-specific settings of a plurality of applications. The personalized framework 11014 implements a theme (for example, when the tone of the entire screen is selected, the tone of each application is synchronized with the selected tone), and user-specific general-purpose environment settings (POP server information or the like) referred to commonly by a plurality of applications.

A user assistance package 11015 is a mechanism of registering and managing documentation (guide/help, manual, tutorial, and the like) of the whole system and applications of the extended control device 103, and assisting the user in using the system and applications.

An input package 11016 processes an input event from the user. Event input sources from the user in the interaction between the user and the system of the extended control device 103 are a physical keyboard, the hard keys of the operation unit, a pointing device (e.g., mouse), a screen keyboard, the emulator of the operation unit, and screen function keys on the function key panel. The input package 11016 also performs a process associated with an input method (input means or front-end processor for inputting characters of each language).

A status/message management package 11017 accepts and manages a status or message asserted by each application. The status/message management package 11017 provides a mechanism which allows the user or another application to acquire the status or message. For example, the status ticker 10015 acquires the message.

An internationalization framework 11018 assists internationalization of the system and applications.

A logging package 11019 provides a mechanism of recording the log of each application. A status in which an application transmits a message to application status/message management and part of the message are automatically logged.

The logging package 11019 processes not only a log for the end user but also a log for debugging an application by the developer.

A window manager 11020 is implemented in cooperation with the window manager of the native general-purpose OS 9001, optimized for the extended control device 103, and is independent of the OS. The window manager 11020 controls display and overlapping of GUI windows opened by various applications. The window manager 11020 provides a window title, menu, and slider which can be easily operated with a finger.

A GUI tool kit 11021 includes a GUI framework, GUI components, and runtime modules which design the look & feel for the system of the extended control device 103.

A sound package 11022 controls presentation of information to the user by the system and applications with a tap sound, alarm sound, and the like. The library of sound data designed for the system of the extended control device 103 is prepared. Sound setting is targeted to personalization.

A secure communication channel 11023 provides a secure network connection implemented by a technique such as cryptography. The secure communication channel 11023 also provides a mechanism of easily tunneling an unsecure TCP connection by using IETF Secure Shell (secsh or SSH).

A secure file system 11024 provides a secure file system, and is implemented by a technique such as cryptography.

A cryptographic processing package 11025 provides a mechanism for a cryptographic process.

A key management package 11026 provides a mechanism of securely managing a key necessary for various cryptographic processes.

An image processing package 11027 provides a mechanism for various image processes. The image processing package 11027 also provides a distributed imaging mechanism of allowing the application of the extended control device 103 to utilize as a distributed service a dedicated image processing function using image processing hardware or the like incorporated in the image processing device 100. OCR and block selection techniques are also treated as part of the image process.

A presentation extension interface 11028 provides a communication mechanism from presentation logic implemented by an application in the system of the extended control device 103 to the business logic of a built-in application in the image processing device 100.

A built-in application extension interface 11029 is implemented by an application protocol and a framework for converting the business logic of a built-in application in the image processing device 100 into a distributed component.

A job/device control interface 11030 is a primitive interface which provides a universal control model common throughout the product series of the image processing device 100. The job/device control interface 11030 allows the application of the system of the extended control device 103 to control the device function of the image processing device 100. The job/device control interface 11030 cannot interface software in the extended control device 103 and a built-in application layer in the image processing device 100.

An image job control interface 11031 is a high-level interface for performing at a high speed a process accompanied with image transfer (e.g., printing or scanning) by the image processing device 100. The image job control interface 11031 allows an application in the system of the extended control device 103 to utilize the device function of the main body of the image processing device 100. The interface 11031 cannot interface with a built-in application layer in the main body of the image processing device 100.

A printer driver 11032 is a mechanism of issuing a print job, fax transmission job, document file storage job from the application of the extended control device 103 to the image processing device 100 by using a print framework provided by the native general-purpose OS 9001.

A scanner driver 11033 is a mechanism of issuing a pull-scan job from the application of the extended control device 103 to the image processing device 100 and acquiring a scanned image by using an image scan framework provide by the native general-purpose OS 9001.

An inter-application communication package 11034 provides a communication mechanism between processes and between threads of software running in the extended control device 103. Since the general-purpose OS 9001 of the extended control device 103 provides an independent memory space which is protected to each process running in the extended control device 103, communication between applications running as different processes requires a special mechanism. The inter-application communication package 11034 implements a transport layer of inter-process communication by using mechanisms such as a shared memory, pipe, and socket provided by the general-purpose OS 9001. An application protocol layer of inter-process communication is based on exchange of XML-based messages using the XML protocol (SOAP), and a tool kit, framework, and engine which assist treatment of the XML protocol are provided. The inter-application communication package 11034 also includes a framework for assisting construction of a distributed system by a plurality of software programs which are distributed at a plurality of nodes and cooperate with each other via a network, like the extended control device 103 and image processing device 100, and the extended control device 103 and an external system. Some frameworks are based on the XML protocol independent of a programming language, and some frameworks are based on RMI which is a Java® distributed object technique.

A macro scripting package 11035 is a macro mechanism of combining a series of software processes into a single process by a technique such as end user programming, scripting, or example learning (user operation is so recorded as to be reproduced). With the macro scripting package 11035, the user can combine a series of processes in a single application into a macro, and can also register and utilize a combination of processes of applications as a macro such as a routine job.

An execution scheduling package 11036 is a mechanism of automatically executing a desired process in synchronism with scheduled-time execution (similar to cron as a UNIX® utility), the event of a system session (e.g., boot-up or shut-down), or the event of a user session (e.g., log-in or log-out).

A Web server 11037 is a service of exchanging data with a request source in response to a request based on a well-known network protocol HTTP (or more secured HTTPS).

An application server 11038 cooperates with the Web server 11037 to provide an operating environment for a Web application which dynamically exchanges data with a client. The application server 11038 transfers as a request an HTTP request message received by the Web server 11037 to a proper application corresponding to the request message, receives a response from the application on the basis of the processing result of the application, and sends back the response as a corresponding HTTP response message to the request source of the original HTTP request. The application server 11038 includes a template engine for dynamically generating a message by using a combination of a template and a program based on the template language in order to efficiently develop and operate a Web application. The application server 11038 comprises an application framework based on an MVC (Model-View-Controller) architecture in order to efficiently develop and operate a Web application.

A SOAP engine 11039 is used to facilitate development of a processor which processes a well-known XML protocol. The SOAP engine 11039 is so configured as to be synchronized with the application server 11038. The SOAP engine 11039 processes a SOAP request message sent from a SOAP client, and transfers the message to appropriate software for processing a message. After the software for processing a message completes a proper process and returns the message, the SOAP engine generates a SOAP response message corresponding to the return, and sends it back to the requesting SOAP client.

An XML took kit 11040 assists software programs in the extended control device 103 in executing processes such as interpretation, generation, and conversion of XML and various markup languages defined as applications of XML.

The basic part of a Java platform 11041 is constructed by a Java platform well known as Java 2 Platform, Standard Edition, or Java 2 Runtime Environment.

Figure 12:
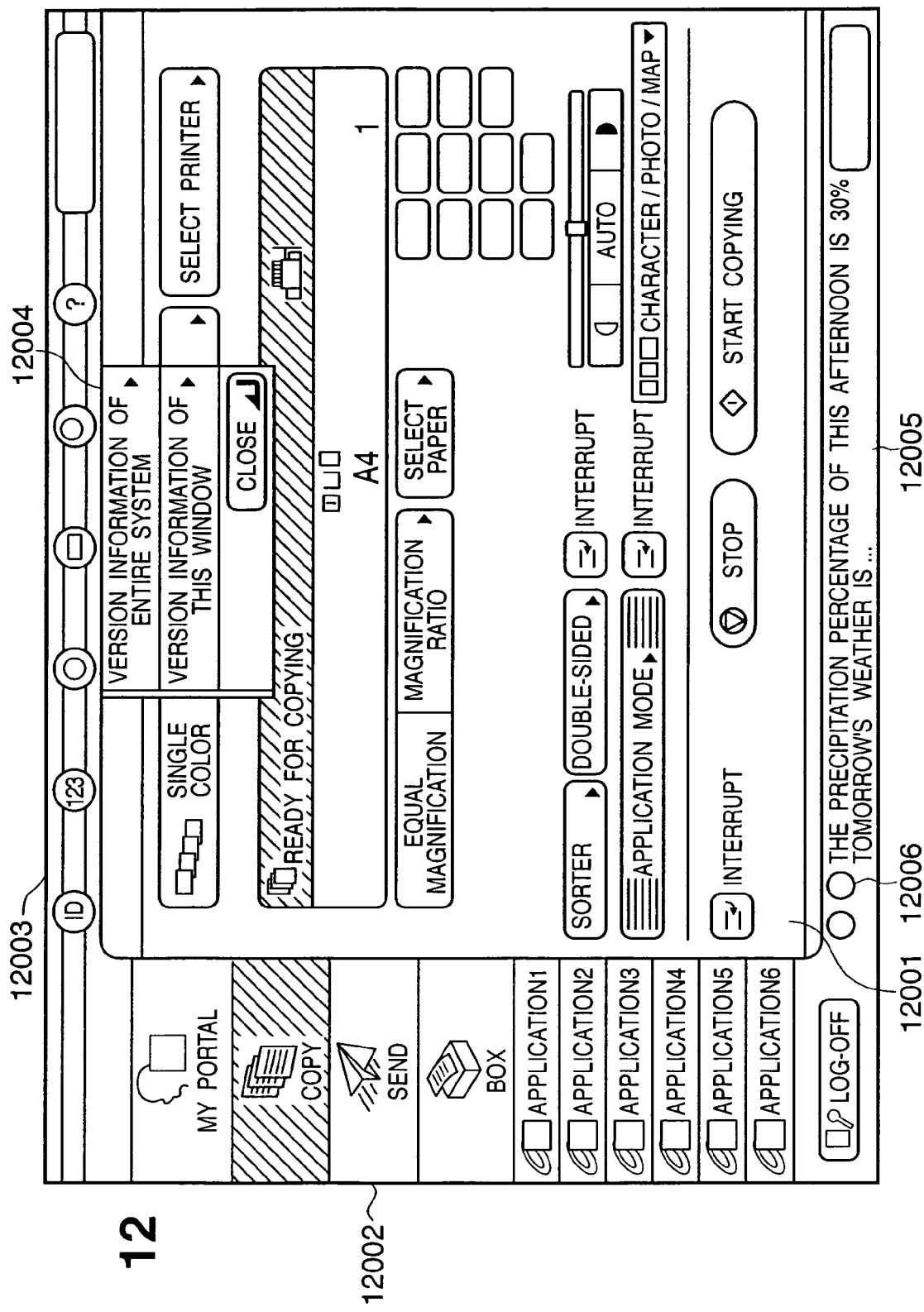
FIG. 12 is a view showing an example of the display window of the operation unit of the image processing device according to the embodiment of the present invention.

FIG. 12 is a view showing an example of the display window of the operation unit 171 of the image processing device 100.

The display monitor is an LCD touch panel having a resolution of 1,024 dots×768 dots. An application display area 12001 is set around the center of the window, and a plurality of windows starting from a copy window are superposed at the same size, as shown in FIG. 12. When viewed from the user, only one front window is seemed to move. An icon box 12002 on the left end of the window corresponds to the above-described window switching means. An application name and icon are displayed in each window in one-to-one correspondence, and when many available applications exist and cannot fall within the window, they can be scrolled and displayed.

By touching an arbitrary icon on the icon box, a corresponding window is displayed in the application display area. A function key panel 12003 at the top of the window provides a set of function buttons commonly used by the extended operation unit 171. By touching each button, another application such as an application guide, screen keyboard (to be described later), or operation panel emulator can be activated. Further, the key code of a reset key or the like can be transmitted to another application.

FIG. 12 illustrates a window when a version display button is touched on the function key panel 12003. By touching the button, a menu 12004 having two choices is displayed to allow selecting whether to display version information of an application currently displayed on the front window or display version information of basic software of the image processing system. A status sticker 12005 at the bottom of the window is an area for displaying a message generated by an application, and displays a message of the highest priority among messages sent from a plurality of applications. A message can be scrolled and displayed, and even a long message can be fully confirmed. A software tally 12006 emulates the tally lamp of the image processing device, and can represent the state (e.g., normal, warning, or error) of the extended control device 103 by red and blue flashing, lighting, or lights-out.

Figure 13:
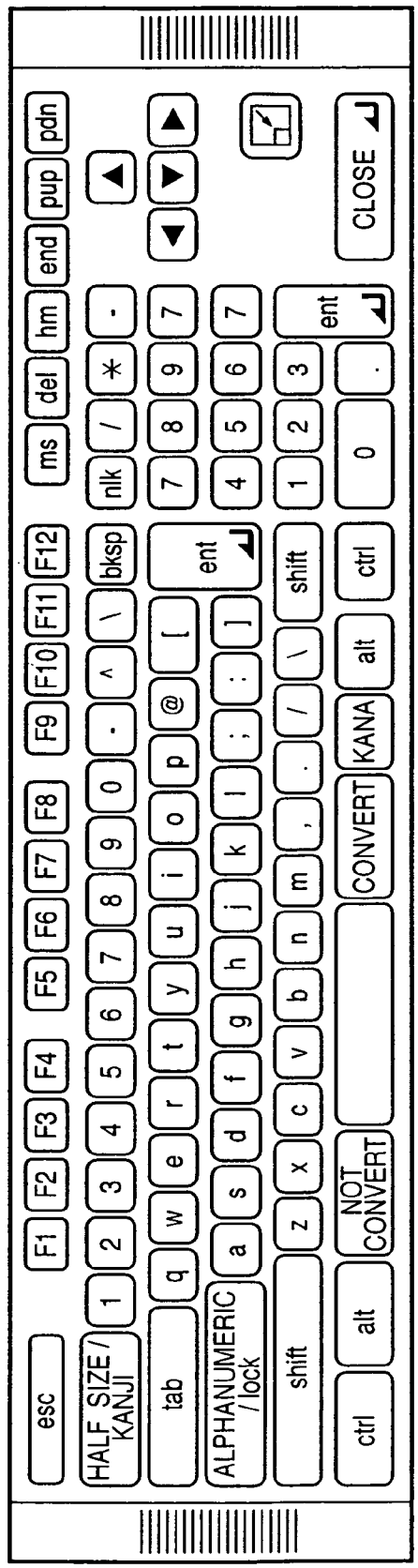
FIG. 13 is a view showing an example of a screen keyboard according to the embodiment of the present invention.

FIG. 13 shows a screen keyboard activated from the function key panel 12003.

The screen keyboard enables character input via an LCD touch panel. The layout can be changed to a 101-key keyboard, 106-key keyboard, or the like in accordance with keyboard setting.

Figure 14:
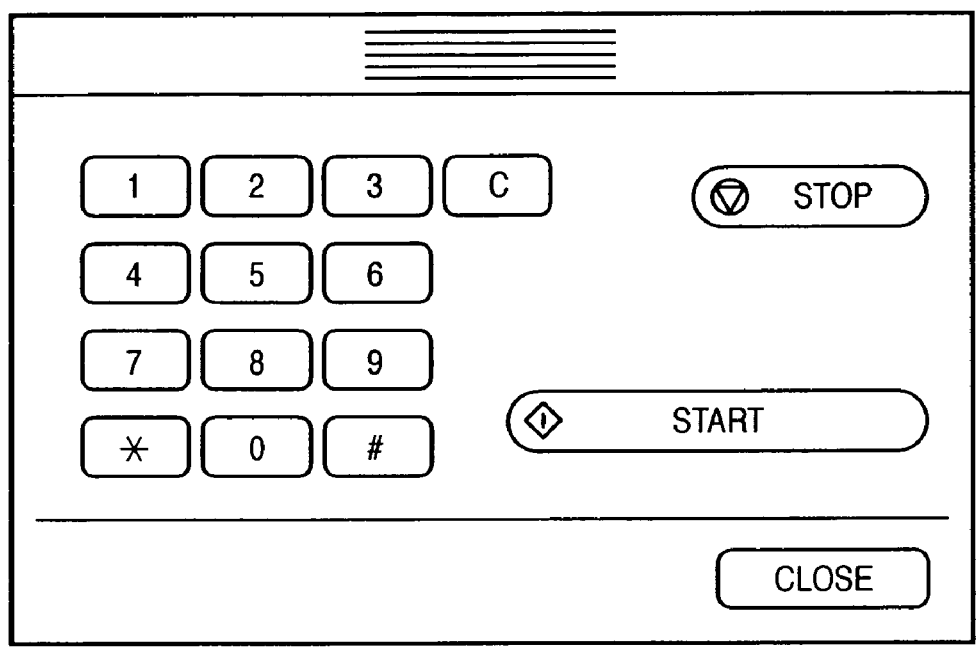
FIG. 14 is a view showing an example of the operation panel emulator of the image processing device according to the embodiment of the present invention.

FIG. 14 shows the operation panel emulator of the image processing device 100 that is activated from the function key panel 12003.

The operation panel emulator enables inputs similar to inputs from the ten-key pad, start key, and stop key of the hardware operation unit of the image processing device 100.

Figure 15:
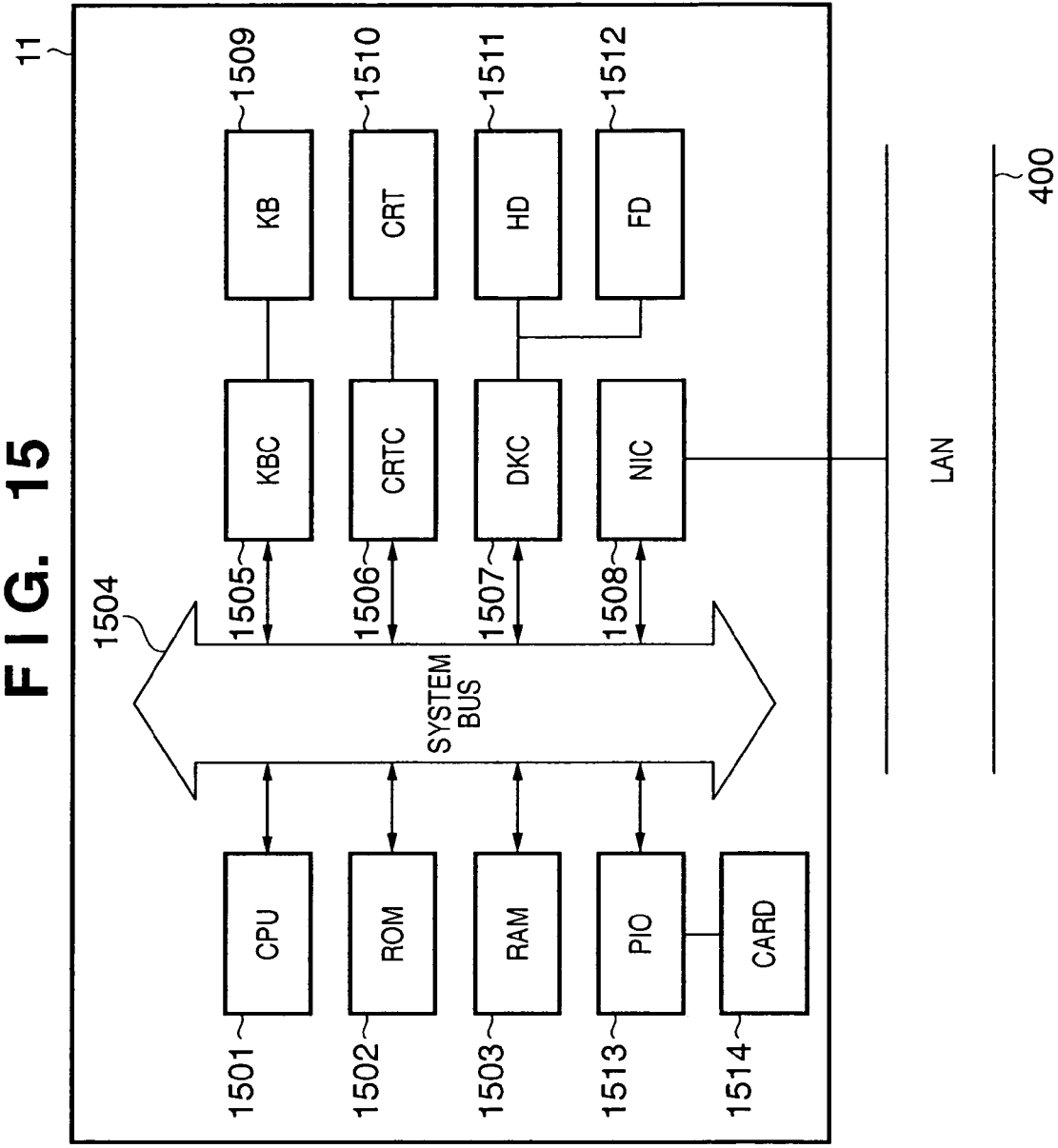
FIG. 15 is a block diagram showing an example of the hardware configuration of a host computer according to the embodiment of the present invention.

FIG. 15 is a block diagram showing the hardware configuration of the host computer 11.

The host computer 11 comprises a CPU 1501 which processes a document containing a figure, image, character, table (including spreadsheet), and the like on the basis of a document processing program or the like that is stored in a ROM 1502 or hard disk (HD) 1511 or supplied from a floppy disk drive (FD) 1512. The CPU 1501 comprehensively controls devices connected to a system bus 1504.

Reference numeral 1503 denotes a RAM which functions as a main memory, work area, and the like for the CPU 1501. Reference numeral 1505 denotes a keyboard controller (KBC) which controls instruction inputs from a keyboard (KB) 1509, pointing device (not shown), and the like. Reference numeral 1506 denotes a CRT controller (CRTC) which controls display of a CRT display (CRT) 1510. Reference numeral 1507 denotes a disk controller (DKC) which controls the hard disk (HD) 1511 and floppy disk drive (FD) 1512 storing a boot program, various application programs, font data, user files, edit files, printer control command generation programs (to be referred to as "printer drivers" hereinafter), and the like. Reference numeral 1508 denotes a network interface card (NIC) which exchanges data in two ways with a network device via the LAN 400. Reference numeral 1513 denotes a controller (PIO) which controls a peripheral device, is connected to an IC card reader/writer (CARD) 1514, and reads/writes information of an IC card.

Figure 16:
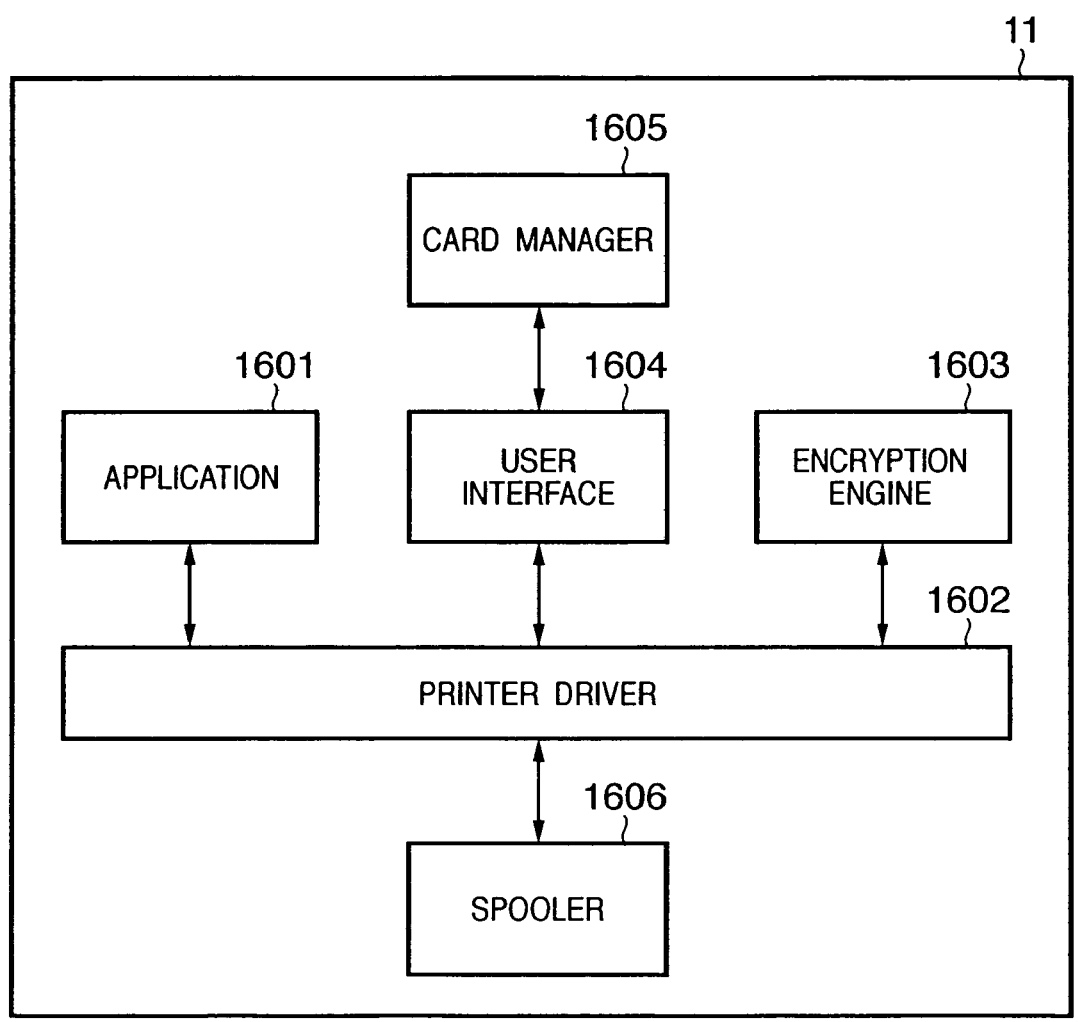
FIG. 16 is a block diagram showing an example of a software configuration for implementing a encrypted-data secure printing function installed in the host computer according to the embodiment of the present invention.

A software configuration for implementing a encrypted-data secure printing function installed in the host computer 11 will be explained with reference to FIG. 16.

An application 1601 is an application program such as a wordprocessor, spreadsheet program, or Internet browser.

A printer driver 1602 converts data created by the application 1601 into print data of a printer control language interpretable by the image processing device 100, and generates print job data containing print data.

An encryption engine 1603 encrypts print job data, and generates the first secret key as the first encryption key for encrypting data.

A user interface 1604 opens various registered windows and executes various data processes on the basis of commands designated with a mouse cursor (not shown) or the like on a CRT 1710. In executing printing, the user opens a window associated with print setting, and performs setting of a printer and setting of a printing method for a printer driver including selection of a printing mode.

A card manager 1605 controls access to an IC card, encrypts and decrypts the first secret key, and acquires a serial number or the like.

A spooler 1606 transmits print job data to the extended control device 103.

In the host computer 11, when the application 1601 designates execution of printing, the printer driver 1602 creates print job data. The created print job data is sent to the encryption engine 1603. The encryption engine 1603 receives the print job data, encrypts it with the first secret key, encrypts the first secret key with the public key of the IC card 1514, and sends back the encrypted print job data and first secret key to the printer driver 1602. The printer driver 1602 receives the encrypted print job data and first secret key, and outputs them to the spooler 1606.

Figure 17:
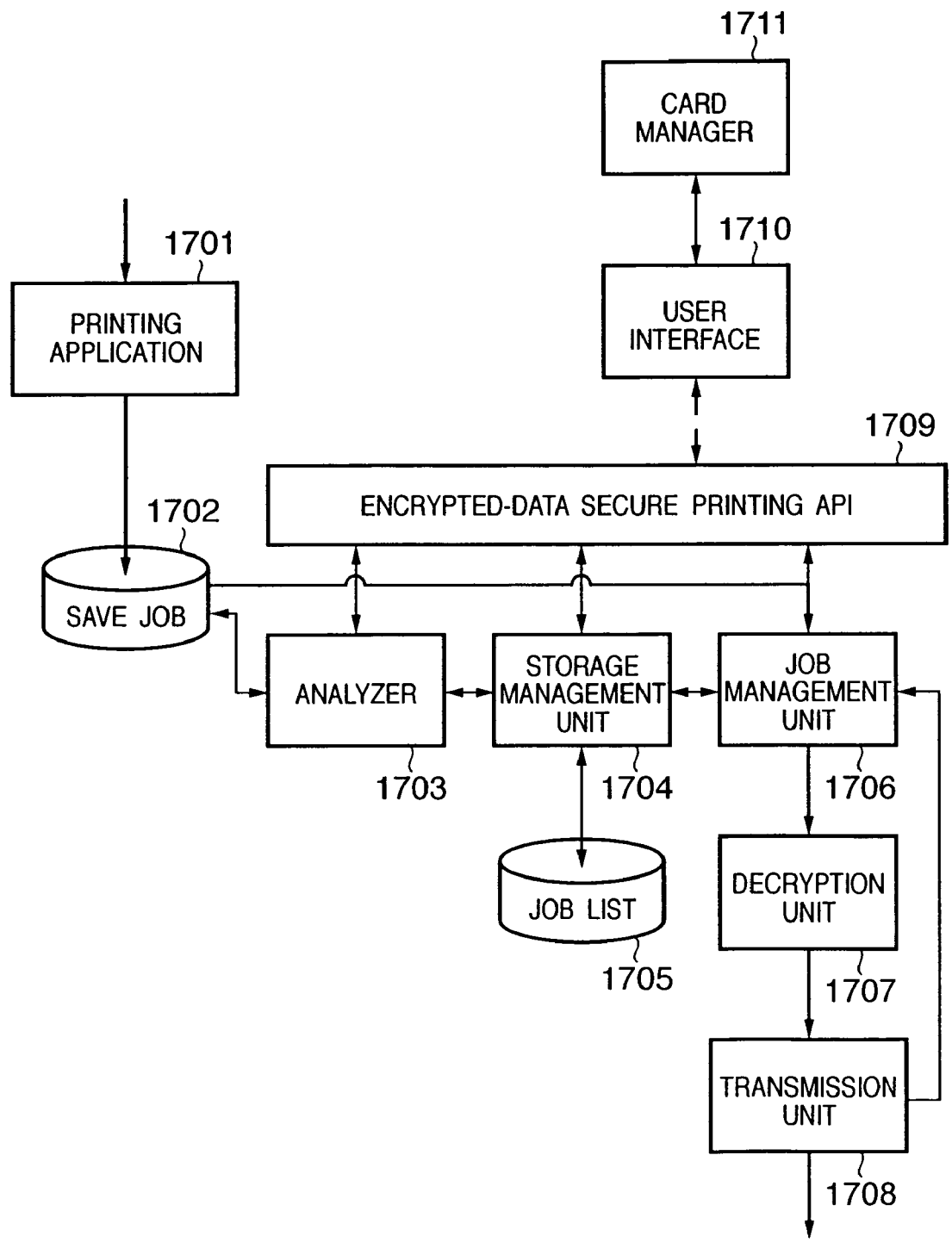
FIG. 17 is a block diagram showing an example of the internal configuration of encrypted-data secure printing software of the extended control device according to the embodiment of the present invention.

An example of the encrypted-data secure printing component 9014 of the extended control device 103 will be explained. FIG. 17 is a block diagram showing an example of the internal configuration of the encrypted-data secure printing component 9014.

A printing application 1701 is an LPD module which receives an encrypted print job. The received print job is saved as a save job 1702 in the hard disk unit 4106 while the job is kept encrypted.

An analyzer 1703 is a module for analyzing the print job, and acquiring a job name, job owner name, encryption method, encrypted first secret key, and the like.

A storage management unit 1704 is a module for managing, as a job list 1705, job information of the save job 1702 stored in the hard disk unit 4106.

A job management unit 1706 is a module for managing printing.

A decryption unit 1707 is a module for decrypting, with the received first secret key, the encrypted print job transferred from the job management unit 1706. The decryption unit 1707 sequentially transfers decrypted parts to a transmission unit 1708.

The transmission unit 1708 is a module for transmitting the print job decrypted by the decryption unit 1707 to the image processing device 100.

A encrypted-data secure printing API 1709 undertakes the main process of encrypted-data secure printing, and the following process is performed using this API.

For example, the encrypted-data secure printing API 1709 performs filtering of the job list 1705 on the basis of the serial number of an IC card inserted into the IC card reader 172. The filtered job list is displayed on the liquid crystal display 4203 via a user interface 1710.

FIG. 19 is a view showing an example of a user interface window by encrypted-data secure printing. For example, a job list 1901 is displayed, and the user can designate with a mouse or the like a job to be printed or erased from the job list 1901.

When the user selects a job and clicks a print start button 1902 to designate the start of printing, the user interface 1710 requests a card manager 1711 to decrypt the first secret key. The encrypted-data secure printing API 1709 restarts the job by using the decrypted first secret key and job handle.

When the user selects a job and clicks an erase button 1903 to designate erase of the job, the encrypted-data secure printing API 1709 erases the job.

Depending on setting, the encrypted-data secure printing API 1709 can restart a job without waiting for selection of a job by the user after an IC card is inserted.

Figure 18A:
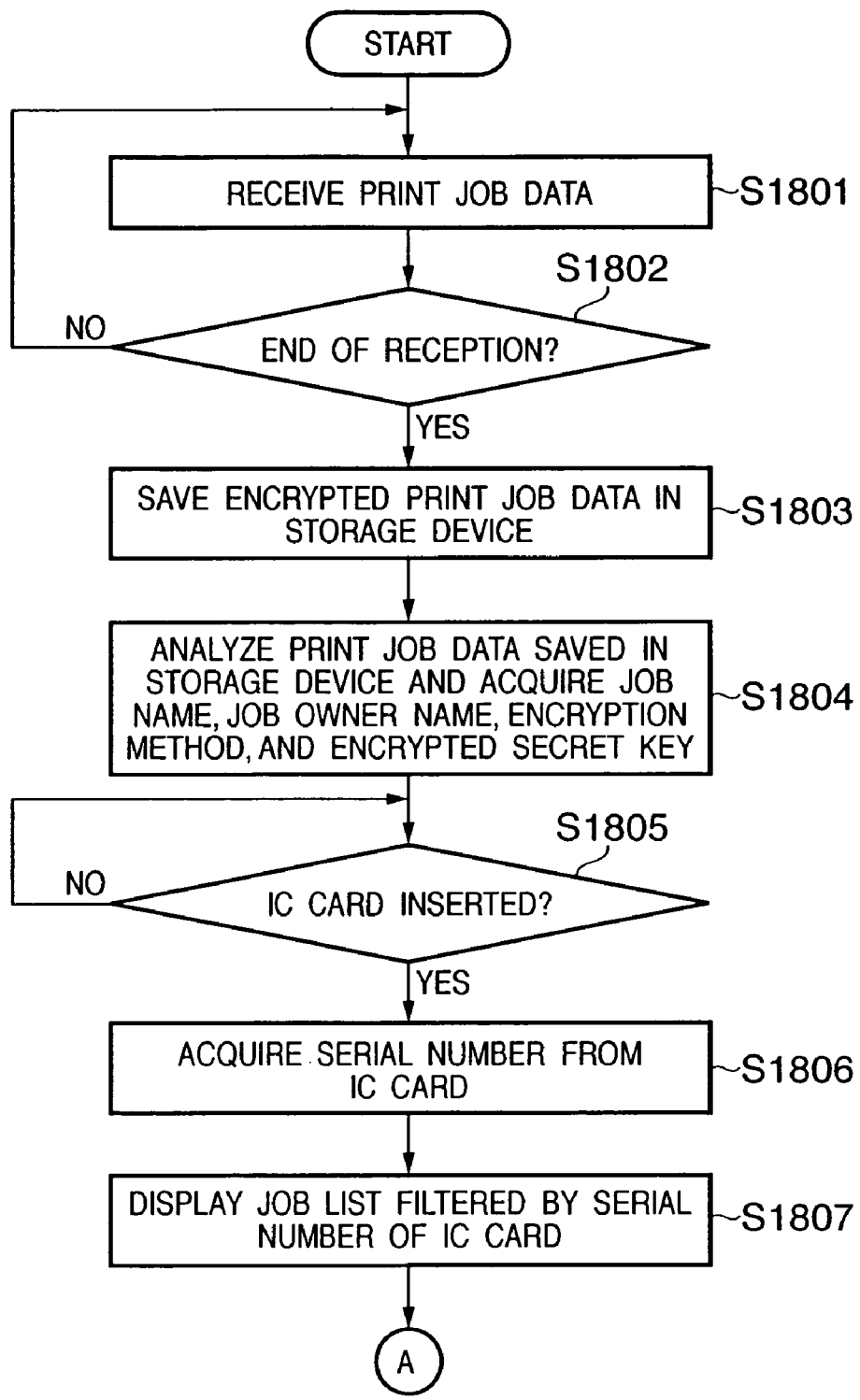
FIGS. 18A and 18B are flowcharts showing a processing sequence by encrypted-data secure printing of the extended control device according to the embodiment of the present invention.
Figure 18B:
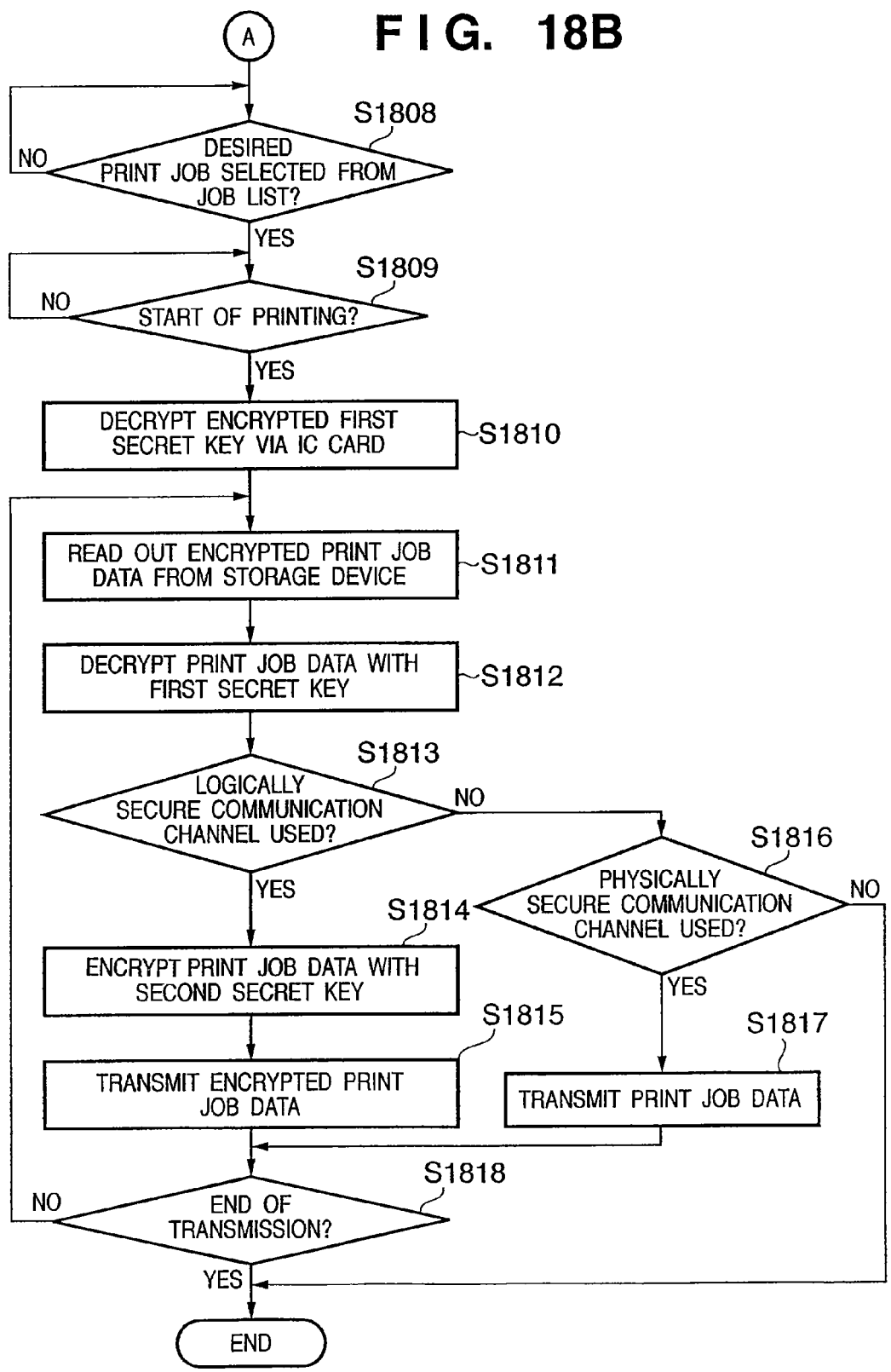

FIGS. 18A and 18B are flowcharts showing a processing sequence by the encrypted-data secure printing component 9014 of the extended control device according to the embodiment.

In step S1801, encrypted print job data transmitted from the host computer is received. In step S1802, it is determined whether reception of the print job data has ended. If YES in step S1802, the process advances to step S1803; if NO, returns to step S1801 to repeat the reception process.

In step S1803, the encrypted print job data is saved as the save job 1702 in a storage device (hard disk unit 4106). In step S1804, the print job data saved in the hard disk unit 4106 is analyzed to acquire the job name, job owner name, encryption method, and encrypted first secret key.

In step S1805, it is determined whether an IC card is inserted in the IC card reader 172. If the IC card is inserted, the process advances to step S1806; if NO, returns to step S1805.

In this manner, the process does not advance to subsequent steps unless an IC card is inserted.

In step S1806, a serial number is acquired from the IC card. In step S1807, a job list filtered by the serial number of the IC card is displayed in a user interface window as shown in FIG. 19. The user can select a job to be printed from the list.

In step S1808, it is determined whether the user has selected a print job from the job list. If YES in step S1808 (i.e., a print job has been selected), the process advances to step S1809; if NO, returns to step S1808.

In step S1809, it is determined whether the user has designated the start of printing of the print job selected in step S1808. If YES in step S1809 (i.e., the user has designated the start of printing), the process advances to step S1810; if NO, returns to step S1809.

In step S1810, the first secret key encrypted with the first public key of the IC card is decrypted via the IC card. The encrypted print job data is read out from the hard disk unit 4106 in step S1811, and decrypted with the first secret key in step S1812.

In step S1813, it is determined whether a logically secure communication channel has been selected for communication between the extended control device 103 and the image processing device 100. The logically secure communication channel means a secure connection implemented by a technique such as cryptography. More specifically, the LAN 400 is used to connect the extended control device 103 and image processing device 100, and the integrity of communication is ensured by cryptography.

If a logically secure communication channel is determined in step S1813 to have been selected, the process advances to step S1814 to encrypt the print job data with the second secret key as the second encryption key. In step S1815, the print job data encrypted with the second secret key is transmitted to the image processing device 100, and the process advances to step S1818.

If no logically secure communication channel is determined in step S1813 to have been selected, the process advances to step S1816 to determine whether a physically secure communication channel has been selected. The physically secure communication channel means a connection which inhibits electronic eavesdropping of transmission data in normal use. More specifically, the extended control device 103 and image processing device 100 are connected by the local I/F 201 represented by USB (Universal Serial Bus) or IEEE1394. Also, an external communication I/F (not shown) is prepared for the expansion connector 124 in addition to the external communication I/F 121, and the extended control device 103 and image processing device 100 are connected directly (i.e., physical one-to-one connection) by Ethernet® 10BASE-T/100BASE-TX or the like using a so-called cross cable without using any HUB. If the cable between the extended control device 103 and the image processing device 100 is detected to be a cross cable or if the user designates the use of a cross cable, the extended control device 103 determines that a physically secure communication channel has been selected.

If a physically secure communication channel is determined in step S1816 to have been selected, the process advances to step S1817 to directly transmit the print job data to the image processing device, and to step S1818.

In step S1818, it is determined whether transmission has ended. If YES in step S1818, the process ends; if NO, returns to step S1811 and is repeated.

If no physically secure communication channel is determined in step S1816 to have been selected, the process ends. That is, if the selected communication channel is neither physically nor logically secure, the process ends without performing any transmission process.

OTHER EMBODIMENT

The embodiment of the present invention has been described in detail. A public key in an IC card is adopted to encrypt the first secret key used between the host computer 11 and the extended control device 103 in the above embodiment, but the cryptographic method available in the present invention is not limited to this. For example, encryption may use an arbitrary password input at the start of printing or a key generated from a password input.

The above embodiment is related to a process of ensuring the integrity of print job data transmitted between the host computer 11, the extended control device 103, and the image processing device 100. The print job data is data for the printing function of the image processing device 100, and the present invention can also be applied to general data including data for respective functions (document filing, document transmission/reception, image conversion, and the like) implemented by the image processing device 100.

Note that the present invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-133913 filed on Apr. 28, 2004, the entire contents of which are hereby incorporated by reference herein.

What is claimed is:

1. An image processing system including an image processing device and a control device which controls data transfer to said image processing device,
   said control device comprising:
      a first connection unit configured to connect a network, and
      a second connection unit configured to connect a cable designed for data transfer, wherein the cable is different from the network,
   said image processing device comprising at least one of a first connection device configured to connect the network and a second connection device configured to connect the cable,
   said control device further comprising:
      reception means for receiving encrypted data from an external device via the network,
      decryption means for decrypting the received/encrypted data, and
      encryption means for encrypting the decrypted received data decrypted by said decryption means to generate re-encrypted received data,
      first determination means for determining whether or not a first communication channel is selected, wherein the first communication channel uses the network and the encryption executed by said encryption means to communicate with said image processing device,
      first transfer means for, when said first determination means determines that the first communication channel is selected, transferring the re-encrypted received data generated by said encryption means to said image processing device via the network,
      second determination means for determining whether or not a second communication channel is selected, wherein the second communication channel uses the cable to communicate with said image processing device, and
      second transfer means for, when said second determination means determines that the second communication channel is selected, transferring the decrypted data decrypted by said decryption means to said image processing device via the cable, wherein when said first determination means determines that the first communication channel is not selected, and said second determination means determines that the second communication channel is not selected, both of the transfer of the re-encrypted received data by said first transfer means to said image processing device and the transfer of the decrypted data by said second transfer means to said image processing device are restricted.

2. The system according to claim 1, wherein said control device further comprising authentication means for performing user authentication,
wherein when the user authentication is successful and said first determination means determines that the first communication channel is selected, said first transfer means is activated, and when the user authentication is successful and said second determination means determines that the second communication channel is selected, said second transfer means is activated.

3. A control device which controls data transfer to an image processing device, comprising:
a first connection unit configured to connect a network;
a second connection unit configured to connect a cable designed for data transfer, wherein the cable is different from the network;
reception means for receiving encrypted data from an external device via the network;
decryption means for decrypting the received/encrypted data;
encryption means for encrypting the decrypted received data decrypted by said decryption means to generate re-encrypted received data;
first determination means for determining whether or not a first communication channel is selected, wherein the first communication channel uses the network and encryption executed by said encryption means to communicate with the image processing device;
first transfer means for, when said first determination means determines that the first communication channel is selected, transferring the re-encrypted received data to the image processing device via the network;
second determination means for determining whether or not a second communication channel is selected, wherein the second communication channel uses the cable to communicate with the image processing device; and
second transfer means for, when said second determination means determines that the second communication channel is selected, transferring the decrypted data decrypted by said decryption means to the image processing device via the cable,
wherein when said first determination means determines that the first communication channel is not selected, and said second determination means determines that the second communication channel is not selected, both of the transfer of the re-encrypted received data by said first transfer means to said image processing device and the transfer of the decrypted data by said second transfer means to said image processing device are restricted.

4. The device according to claim 3, further comprising authentication means for performing user authentication,
wherein when the user authentication is successful and said first determination means determines that the first communication channel is selected, said first transfer means is activated, and when the user authentication is successful and said second determination means determines that the second communication channel is selected, said second transfer means is activated.

5. The device according to claim 3, further comprising:
encryption key reception means for receiving encrypted first encryption key data from the external device via the network; and
encryption key decryption means for decrypting the encrypted first encryption key data with an input key to obtain a first encryption key,
wherein said reception means receives data encrypted with the first encryption key, and
said decryption means decrypts the encrypted data received by said reception means with the decrypted first encryption key.

6. The device according to claim 5, wherein when said first determination means determines that the first communication channel is selected, said encryption means encrypts, using a second encryption key, the data decrypted by said decryption means with the first encryption key, and said first transfer means transfers the data encrypted with the second encryption key to the image processing device via the network.

7. The device according to claim 3, further comprising display means for displaying a list of jobs on the basis of identification information stored in a card,
wherein said decryption means decrypts encrypted data corresponding to a job selected from the list.

8. A control device which controls data transfer to an image processing device, comprising:
a first connection unit configured to connect a network;
a second connection unit configured to connect the image processing device and the control device physically in a one to one correspondence;
reception means for receiving encrypted data from an external device via the network;
decryption means for decrypting the encrypted data received by said reception means;
encryption means for encrypting the decrypted received data decrypted by said decryption means to generate re-encrypted received data;
first determination means for determining whether or not a first communication channel is selected, wherein the first communication channel uses the network and encryption executed by said encryption means to communicate with the image processing device;
first transfer means for, when said first determination means determines that the first communication channel is selected, transferring the re-encrypted received data generated by said encryption means to the image processing device via the network,
second determination means for determining whether or not a second communication channel is selected, wherein the second communication channel uses the second connection unit to communicate with the image processing device; and
second transfer means for, when said second determination means determines that the second communication channel is selected, transferring the decrypted data decrypted by said decryption means to the image processing device via the second connection unit,
wherein when said first determination means determines that the first communication channel is not selected, and said second determination means determines that the second communication channel is not selected, both of the transfer of the re-encrypted received data by said first transfer means to said image processing device and the transfer of the decrypted data by said second transfer means to said image processing device are restricted.

9. A method for controlling a control device having a first connection unit for connecting a network and a second connection unit for connecting a cable different from the network, and which controls data transfer to an image processing device, comprising the steps of:

receiving encrypted data from an external device via the network;

decrypting the received encrypted data;

encrypting the decrypted data decrypted in said decrypting step to generate re-encrypted received data;

a first determination step of determining whether or not a first communication channel is selected, wherein the first communication channel uses the network and encryption executed in said encrypting step to communicate with the image processing device;

a first transfer step of, when said first determination step determines that the first communication channel is selected, transferring the re-encrypted received data generated in said encrypting step to the image processing device via the network, a second determination step of determining whether or not a second communication channel is selected, wherein the second communication channel uses the cable to communicate with the image processing device;

a second transfer step of, when said second determination step determines that the second communication channel is selected, transferring the decrypted data decrypted in said decrypting step to the image processing device via the cable, and a restricting step of, when said first determination step determines that the first communication channel is not selected, and said second determination step determines that the second communication channel is not selected, restricting the transfer of the re-encrypted received data by said first transfer step to the image processing device and the transfer of the decrypted data by said second transfer step to said image processing device.

10. A method for controlling a control device having a first connection unit for connecting a network and a second connection unit for connecting an image processing device and the control device physically one to one, and which controls data transfer to the image processing device, comprising the steps of:

receiving encrypted data from an external device via the network;

decrypting the received encrypted data;

encrypting the decrypted data decrypted in said decrypting step to generate re-encrypted received data;

a first determination step of determining whether or not a first communication channel is selected, wherein the first communication channel uses the network and encryption executed in said encrypting step to communicate with the image processing device;

a first transfer step of, when said first determination step determines that the first communication channel is selected, transferring the re-encrypted received data generated in said encrypting step to the image processing device via the network, a second determination step of determining whether or not a second communication channel is selected, wherein the second communication channel uses the cable to communicate with the image processing device;

a second transfer step of, when said second determination step determines that the second communication channel is selected, transferring the decrypted data decrypted in said decrypting step to the image processing device via the cable, and a restricting step of, when said first determination step determines that the first communication channel is not selected, and said second determination step determines that the second communication channel is not selected, both of restricting the transfer of the re-encrypted received data by said first transfer step to the image processing device and the transfer of the decrypted data by said second transfer step to said image processing device.

11. A program, embodied in a non-transitory computer-readable medium, for controlling a control device having a first connection unit for connecting a network and a second connection unit for connecting a data transfer cable different from the network, and which controls data transfer to an image processing device, comprising the codes for: receiving encrypted data from an external device via the network; decrypting the received encrypted data; encrypting the decrypted data decrypted in said decrypting step to generate re-encrypted received data: a first determination step of determining whether or not a first communication channel is selected, wherein the first communication channel uses the network and encryption executed in said encrypting step to communicate with the image processing device; a first transfer step of, when said first determination step determines that the first communication channel is selected, transferring the re-encrypted received data generated in said encrypting step to the image processing device via the network, a second determination step of determining whether or not a second communication channel is selected, wherein the second communication channel uses the cable to communicate with the image processing device; and a second transfer step of, when said second determination step determines that the second communication channel is selected, transferring the decrypted data decrypted in said decrypting step to the image processing device via the cable, and a restricting step of, when said first determination step determines that the first communication channel is not selected, and said second determination step determines that the second communication channel is not selected, restricting both of the transfer of the re-encrypted received data by said first transfer step to the image processing device and the transfer of the decrypted data by said second transfer step to said image processing device.

* * * * *